(12) United States Patent
Sato et al.

(10) Patent No.: US 12,340,943 B2
(45) Date of Patent: Jun. 24, 2025

(54) ELECTRONIC DEVICE

(71) Applicant: TDK CORPORATION, Tokyo (JP)

(72) Inventors: Takaaki Sato, Tokyo (JP); Akihiro Masuda, Tokyo (JP); Norihisa Ando, Tokyo (JP); Shinya Ito, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 228 days.

(21) Appl. No.: 18/303,703

(22) Filed: Apr. 20, 2023

(65) Prior Publication Data

US 2023/0386747 A1 Nov. 30, 2023

(30) Foreign Application Priority Data

May 30, 2022 (JP) .................................. 2022-087884

(51) Int. Cl.
*H01G 4/224* (2006.01)
*H01G 4/012* (2006.01)
*H01G 4/232* (2006.01)

(52) U.S. Cl.
CPC ............. *H01G 4/224* (2013.01); *H01G 4/012* (2013.01); *H01G 4/232* (2013.01)

(58) Field of Classification Search
CPC .......... H01G 4/12; H01G 4/012; H01G 4/224; H01G 4/236; H01G 4/232
See application file for complete search history.

(56) References Cited

U.S. PATENT DOCUMENTS

| | | | |
|---|---|---|---|
| 2008/0068775 A1* | 3/2008 | Imamura ................ | H01G 4/224 361/301.1 |
| 2010/0039748 A1* | 2/2010 | Fujii ...................... | H01G 4/224 361/274.1 |
| 2018/0019062 A1* | 1/2018 | Okuzuka ................ | H01G 2/106 |
| 2018/0182553 A1* | 6/2018 | Yazawa .................. | H01G 4/224 |
| 2018/0233285 A1* | 8/2018 | Sato ........................ | H01G 4/18 |
| 2018/0342350 A1* | 11/2018 | Koyama .................. | H01G 2/04 |
| 2019/0080850 A1* | 3/2019 | Inazumi .................. | H01G 2/04 |
| 2020/0128674 A1* | 4/2020 | Yazawa .................. | H05K 5/03 |
| 2020/0279690 A1* | 9/2020 | Kikkawa ................ | H01G 4/32 |
| 2021/0043382 A1 | 2/2021 | Masuda et al. | |
| 2023/0038001 A1* | 2/2023 | Takahashi ............... | H01G 4/224 |

FOREIGN PATENT DOCUMENTS

JP 2021-027286 A 2/2021

\* cited by examiner

*Primary Examiner* — Michael P McFadden
(74) *Attorney, Agent, or Firm* — Oliff PLC

(57) ABSTRACT

An electronic device includes a chip component, a case, a resin, and a conductive terminal. The chip component includes a terminal electrode. The case includes an accommodation recess for accommodating the chip component. The resin is filled in the accommodation recess. The conductive terminal is attachable to the case. The conductive terminal includes an inner electrode portion disposed in the accommodation recess and connected to the terminal electrode. The inner electrode portion includes a space formation portion forming a filling space for a conductive agent with an outer surface of the chip component at a position closer to a bottom surface than to an opening of the accommodation recess.

8 Claims, 15 Drawing Sheets

ELECTRONIC DEVICE

BACKGROUND OF THE INVENTION

The present disclosure relates to an electronic device including a case capable of accommodating a chip component.

As an electronic device including a case capable of accommodating a chip component, for example, there is an electronic device described in Patent Document 1. In the electronic device described in Patent Document 1, a metal terminal connected to a terminal electrode of a chip component is attached to a case.

The metal terminal includes an inner electrode portion contacted with the terminal electrode of the chip component. A part of the inner electrode portion is curved toward the terminal electrode and is locally contacted with the terminal electrode. Without using solder, the inner electrode portion is fixed to the terminal electrode due to its elasticity. However, the research by the present inventors reveals that the contact between the inner electrode portion and the terminal electrode may become insufficient during reflow of the electronic device.

Patent Document 1: JP2021027286 (A)

BRIEF SUMMARY OF THE INVENTION

The present disclosure has been achieved under such circumstances. It is an object of the disclosure to provide an electronic device capable of preventing the occurrence of contact failure.

As a result of research and study, the present inventors have newly discovered the following facts. The interior of a case is filled with a potting resin, for example, in order to ensure humidity resistance or impact resistance of a chip component. During reflow of an electronic device, however, the contact point between an inner electrode portion and a terminal electrode may be displaced due to, for example, expansion of the potting resin, resulting in a contact failure between the inner electrode portion and the terminal electrode. Therefore, as a result of earnest consideration, the present inventors have found a technique for preventing the occurrence of such a problem.

To achieve the above object, an electronic device according to the present disclosure comprises:
- a chip component including a terminal electrode;
- a case including an accommodation recess for accommodating the chip component;
- a resin filled in the accommodation recess; and
- a conductive terminal attachable to the case, wherein the conductive terminal includes an inner electrode portion disposed in the accommodation recess and connected to the terminal electrode, and the inner electrode portion includes a space formation portion forming a filling space for a conductive agent with an outer surface of the chip component at a position closer to a bottom surface than to an opening of the accommodation recess.

In the electronic device according to the present disclosure, when the terminal electrode of the chip component is connected to the inner electrode portion, a filling space is formed between the outer surface of the chip component and the space formation portion. A conductive agent is filled into the filling space, and the terminal electrode and the space formation portion can thereby be connected via this conductive agent. As a result, it is possible to prevent a displacement of the contact point between the inner electrode portion and the terminal electrode due to expansion of the resin and to prevent the occurrence of contact failure between them.

Since the filling space is formed at a position closer to the bottom surface than to the opening of the accommodation recess, the conductive agent filled in the filling space is covered with the resin filled in the accommodation recess. As a result, it is possible to prevent the exposure of the conductive agent to the external space and to improve the humidity resistance of the conductive agent and, furthermore, the reliability of the electronic device.

The space formation portion and the terminal electrode may be connected via the conductive agent filled in the filling space. In this case, as mentioned above, since the space formation portion and the terminal electrode are connected physically, it is possible to prevent a contact failure between the inner electrode portion and the terminal electrode due to expansion of the resin.

The space formation portion may protrude toward a direction away from the outer surface of the chip component. In this case, the distance between the terminal electrode and the space formation portion is increased, and the volume of the filling space can be increased. As a result, the volume of the conductive agent filled in the filling space is increased, and the connection strength between the space formation portion and the terminal electrode can be increased.

A side surface of the chip component may be opposed to the bottom surface of the accommodation recess, and the space formation portion may be located around a corner intersected by an end surface and the side surface of the chip component. In this case, the space formation portion is disposed at a position closer to the bottom surface than to the opening of the accommodation recess. Thus, the filling space is also formed at a position closer to the bottom surface than to the opening of the accommodation recess. As a result, the conductive agent filled in the filling space can be covered with the resin so as not to be exposed to the external space.

The space formation portion may be bent and surround the corner so as to form the filling space between the end surface and the space formation portion and between the side surface and the space formation portion. In this case, the filling space is surrounded by the space formation portion and the end surface and the side surface of the chip component. Thus, the conductive agent is less likely to leak from the filling space, and the volume of the conductive agent filled in the filling space can be increased.

The inner electrode portion may include an end-surface opposing portion continuing to the space formation portion and disposed away from the end surface of the chip component, and a distance between the space formation portion and the end surface of the chip component may be larger than a distance between the end-surface opposing portion and the end surface of the chip component. In this case, the volume of the filling space can be increased, and the volume of the conductive agent filled in the filling space can be increased.

The inner electrode portion may include a bent portion bent toward the end surface of the chip component, and the space formation portion may be formed integrally with the bent portion. When the inner electrode portion includes the bent portion, the inner electrode portion obtains elasticity, and the inner electrode portion can be fixed to the terminal electrode by elasticity.

The space formation portion may have a width narrower than that of the terminal electrode. In this case, the volume of the filling space can be adjusted according to the width of the space formation portion. Thus, the space formation portion and the terminal electrode can be connected via the conductive agent while adjusting the amount of the conductive agent filled in the filling space.

The inner electrode portion may include a plurality of inner electrode portions, the space formation portion may include a plurality of space formation portions formed in the plurality of inner electrode portions, and the inner electrode portions may be separated from each other. In this case, the conductive agent can be filled into a plurality of filling spaces formed at the plurality of space formation portion. Thus, the plurality of space formation portions is connected to the terminal electrode at a plurality of positions via the conductive agent. This makes it possible to improve the connection reliability between the conductive terminal and the terminal electrode.

An outer surface of the case may be provided with: a pair of connection protrusions protruding outward from the outer surface of the case; and a connection recess recessed inward from the outer surface of the case. In this case, when the electronic device is provided with a plurality (e.g., two) of cases, these cases can be connected by engaging the connection protrusions of one case with the connection recess of the other case.

BRIEF DESCRIPTION OF THE DRAWING(S)

DETAILED DESCRIPTION OF THE INVENTION

Embodiments of the present disclosure are described with reference to the drawings. Although the embodiments of the present disclosure are described with reference to the drawings as necessary, the illustrated contents are only schematically and exemplarily shown for understanding of the present disclosure, and the appearance, dimensional ratio, etc. may be different from the actual one. Hereinafter, the present disclosure is specifically described based on the embodiments, but is not limited to these embodiments.

First Embodiment

Figure 1A:
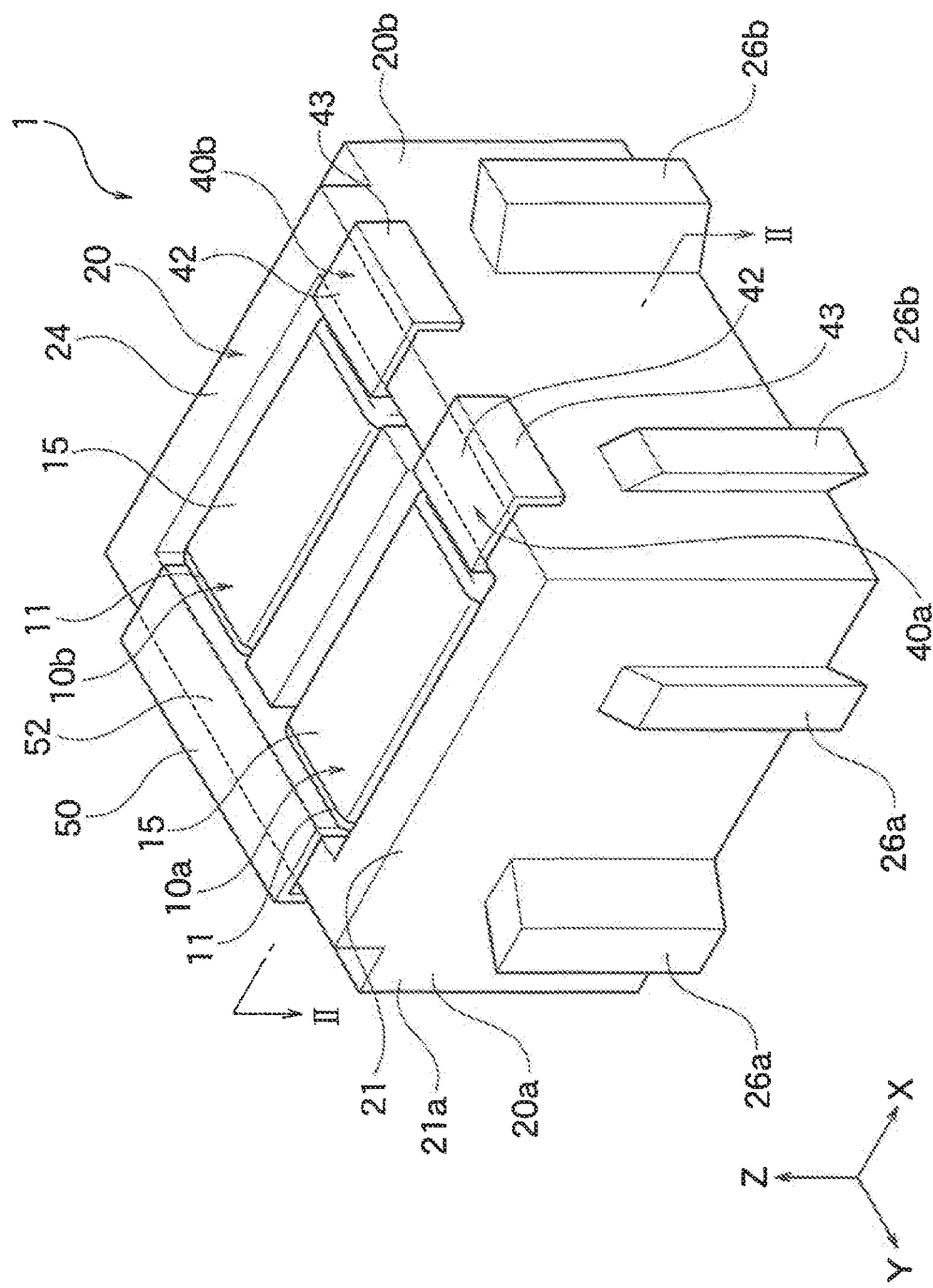
FIG. 1A is a perspective view of an electronic device according to First Embodiment.
Figure 1B:
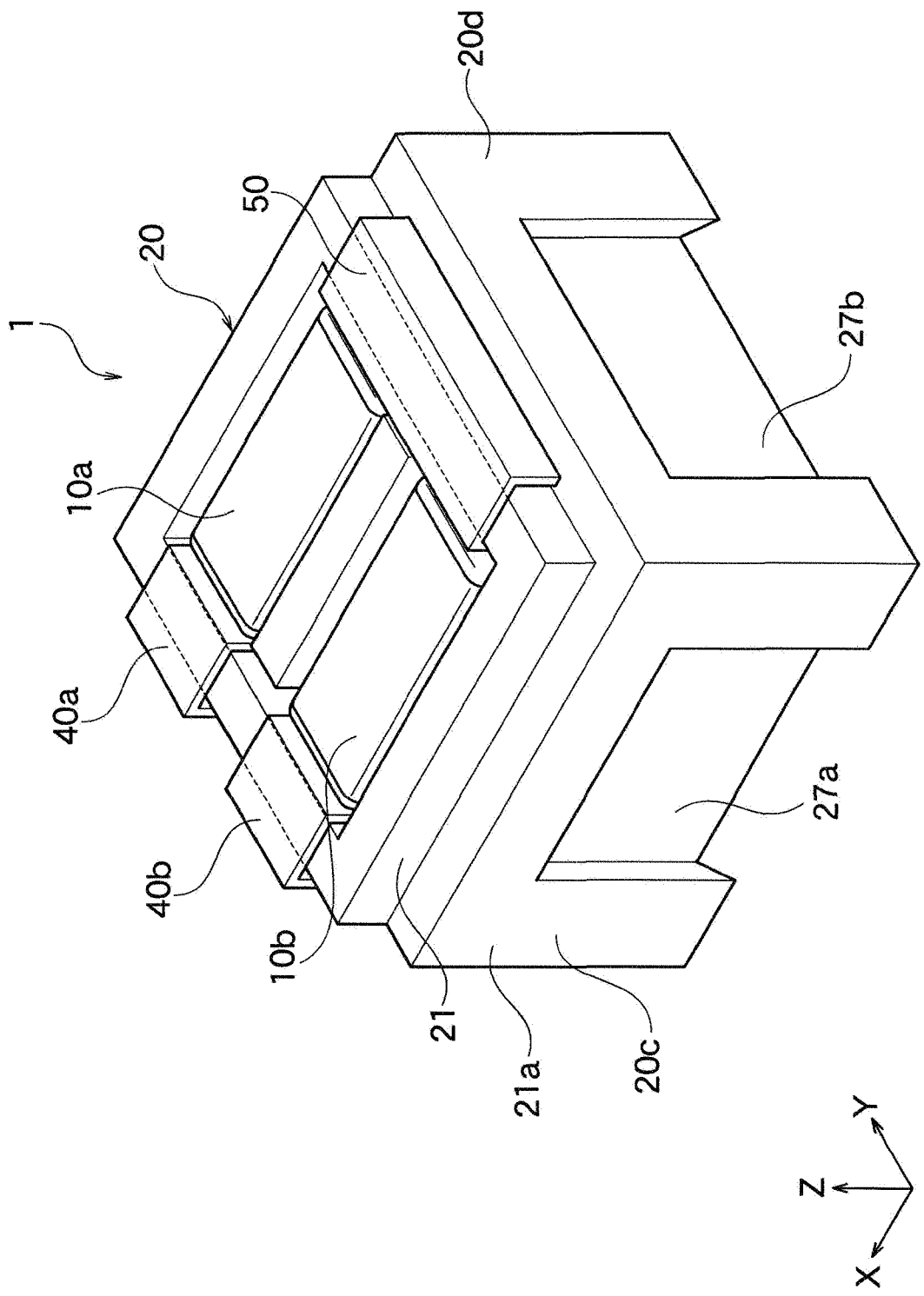
FIG. 1B is a perspective view of the electronic device shown in FIG. 1A viewed from another angle.

As shown in FIG. 1A and FIG. 1B, an electronic device 1 of First Embodiment includes capacitor chips 10a and 10b, a case 20, a resin 30 (FIG. 2), individual conductive terminals 40a and 40b, and a common conductive terminal 50.

In the figures, the XYZ coordinate system is a coordinate system based on the case 20. When the case 20 is viewed in a planar manner, the axis parallel to one of two orthogonal sides of the case 20 is the X-axis, and the axis parallel to the other side is the Y-axis. The Z-axis is the axis perpendicular to the bottom surface of the case 20. The origin of the XYZ coordinate system is determined at the center of the bottom surface of the case 20.

For each of the X-axis, Y-axis, and Z-axis, the positive direction side of the origin may be referred to as "one side", and the negative direction side of the origin may be referred to as "the other side". In particular, one side of the Z-axis is referred to as "upper", and the other side of the Z-axis is referred to as "lower." Moreover, the direction toward the center of the case 20 is referred to as "inner side", and the direction away from the center of the case 20 is referred to as "outer side".

Each of the capacitor chips 10a and 10b has a substantially rectangular parallelepiped shape, and the capacitor chips 10a and 10b have the same shape and size. In the present embodiment, "the same" includes not only exact the same, but also includes a variation due to an error within ±several percent. Hereinafter, in order to avoid duplication of description, only the capacitor chip 10a is described with respect to the common structure between the capacitor chips 10a and 10b.

The outer surface of the capacitor chip 10a includes a plurality (six in the present embodiment) of surfaces. Among these surfaces, two surfaces located opposite to each other in the X-axis are an end surface 13 and an end surface 14 (FIG. 2), and the remaining four surfaces are side surfaces 15.

Figure 2:
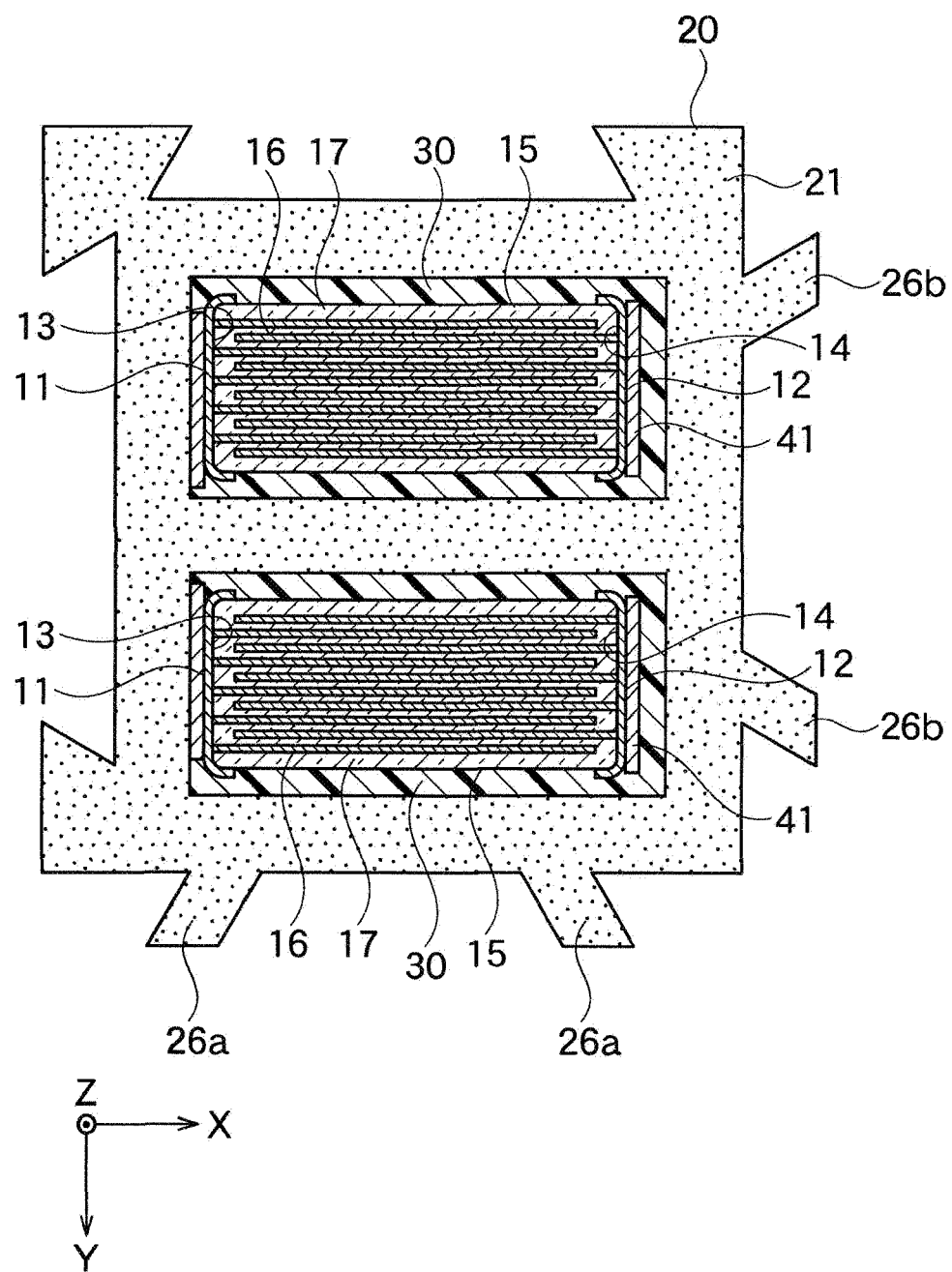
FIG. 2 is a cross-sectional view of chip components shown in FIG. 1A taken along line II-II.

As shown in FIG. 2, the capacitor chip 10a includes a plurality of internal electrode layers 16 and a plurality of dielectric layers 17. The plurality of internal electrode layers 16 and the plurality of dielectric layers 17 are laminated along the Y-axis direction. Terminal electrodes 11 and 12 are formed on the end surfaces 13 and 14, respectively. The internal electrode layers 16 are connected to the terminal electrodes 11 or 12. The terminal electrode 11 partly wraps around the side surface 15. Likewise, the terminal electrode 12 partly wraps around the side surface 15.

The shape and size of the capacitor chip 10a are not limited. The X-axis dimension of the capacitor chip 10a is, for example, 1.0 to 6.5 mm, the Y-axis dimension is, for example, 0.3 to 5.5 mm, and the Z-axis dimension is, for example, 0.3 to 5.5 mm.

Figure 3:
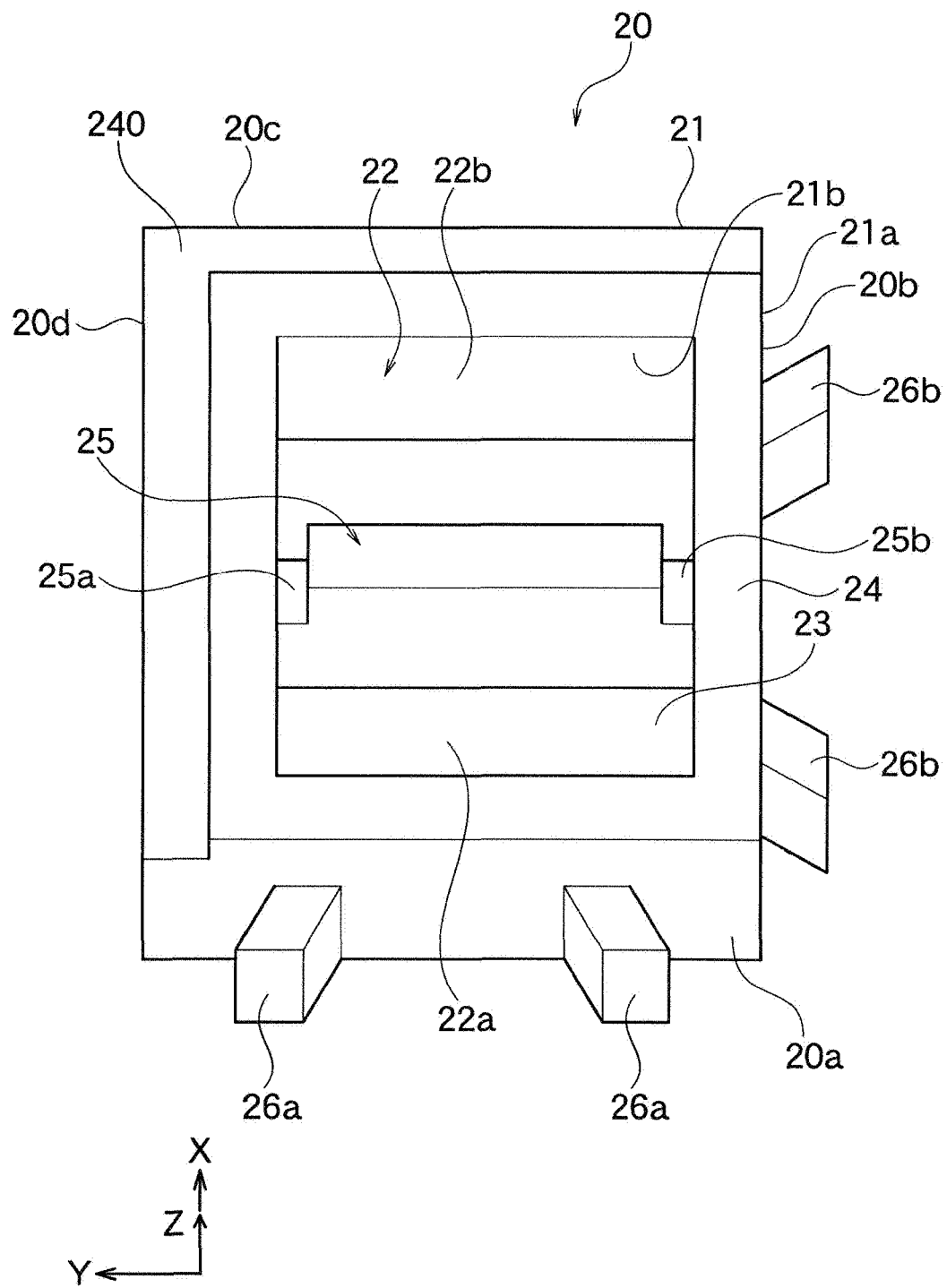
FIG. 3 is a perspective view of a case shown in FIG. 1A.

As shown in FIG. 3, the case 20 includes an accommodation recess 22 for accommodating the capacitor chips 10a and 10b. The case 20 may include a wall 21, a bottom surface 23, an opening edge surface 24, a partition portion 25, connection protrusions 26a and 26b, and connection recesses 27a and 27b. The case 20 is made of an insulator, such as ceramic, glass, and synthetic resin.

The bottom surface 23 constitutes the bottom of the case 20. At least one of the side surfaces 15 of the capacitor chip 10a is disposed on the bottom surface 23 so as to face each other. Also, at least one of the side surfaces 15 of the capacitor chip 10b is disposed on the bottom surface 23 so as to face each other.

The wall 21 has a tubular shape and is formed along the outer edge of the bottom surface 23. The wall 21 is raised perpendicularly to the bottom surface 23 from the outer edge of the bottom surface 23. The wall 21 includes an outer surface 21a and an inner surface 21b located on the other side of the outer surface 21a. In the present embodiment, an error within ±10 degrees is allowed for verticality, and an error within ±10 degrees is allowed for parallelism.

The outer surface 21a includes a first surface 20a, a second surface 20b, a third surface 20c, and a fourth surface 20d. The first surface 20a and the third surface 20c are located opposite to each other along the X-axis, and the second surface 20b and the fourth surface 20d are located opposite to each other along the Y-axis.

The accommodation recess 22 is a space surrounded by the inner surface 21b and is open upward. The accommodation recess 22 includes an accommodation space 22a for accommodating the capacitor chip 10a and an accommodation space 22b for accommodating the capacitor chip 10b. The height of the accommodation space 22a may be larger than the length of the capacitor chip 10a along the Z-axis, and the height of the accommodation space 22b may be larger than the length of the capacitor chip 10b along the Z-axis.

The capacitor chips 10a and 10b can effectively be protected from impact and the like by accommodating the capacitor chips 10a and 10b into the accommodation space 22a and the accommodation space 22b, respectively. The resin 30 (FIG. 2) is filled in the accommodation recess 22. The resin 30 is an insulating resin and is, for example, a thermosetting resin, such as an epoxy based resin and a phenol based resin.

The humidity resistance, vibration resistance, impact resistance, dust resistance, heat dissipation, or the like of the electronic device 1 can be improved by sealing the capacitor chips 10a and 10b with the resin 30.

The opening edge surface 24 is an upper end surface of the wall 21. The opening edge surface 24 is formed in a square ring shape along the opening edge of the accommodation recess 22. A stepped portion 240 is formed on the positive side of the opening edge surface 24 in the Y-axis direction and on the negative side of the opening edge surface 24 in the X-axis direction. The stepped portion 240 extends in an L shape on the outer side of the opening edge surface 24. The stepped portion 240 is located below the opening edge surface 24.

The partition portion 25 is formed inside the accommodation recess 22. The partition portion 25 is raised perpendicularly to the bottom surface 23 from the center of the bottom surface 23 in the X-axis and extends along the Y-axis. The partition portion 25 partitions the accommodation recess 22 into the accommodation space 22a and the accommodation space 22b.

Communication grooves 25a and 25b are formed at the upper end of the partition portion 25. The communication groove 25a is formed at the end of the partition portion 25 on the positive side in the Y-axis direction, and the communication groove 25b is formed at the end of the partition portion 25 on the negative side in the Y-axis direction. The accommodation space 22a and the accommodation space 22b communicate with each other via the communication grooves 25a and 25b.

As shown in FIG. 1A and FIG. 1B, a pair of connection protrusions 26a is formed on the first surface 20a of the outer surface 21a, and a pair of connection protrusions 26b is formed on the second surface 20b. Also, a connection recess 27a is formed on the third surface 20c of the outer surface 21a, and a connection recess 27b is formed on the fourth surface 20d.

The connection protrusions 26a have a columnar shape and protrude toward a direction away from the first surface 20a. The connection protrusions 26a extend from the lower end to the vicinity of the center of the first surface 20a along the Z-axis. In a plan view, the pair of connection protrusions 26a extends obliquely with respect to the Y-axis. The distance between the pair of connection protrusions 26a along the X-axis increases toward the positive side in the Y-axis direction. The XY cross-sectional shape of the connection protrusions 26a is a parallelogram, and the XZ cross-sectional shape of the connection protrusions 26a is a rectangle (oblong), but the shape of the connection protrusions 26a is not limited to this.

The connection protrusions 26b have a columnar shape and protrude in a direction away from the second surface 20b. The connection protrusions 26b extend from the lower end to the vicinity of the center of the second surface 20b along the Z-axis. In a plan view, the pair of connection protrusions 26b extends obliquely with respect to the X-axis. The distance between the pair of connection protrusions 26b along the Y-axis increases toward the positive side in the X-axis direction. The XY cross-sectional shape of the connection protrusions 26b is a parallelogram, and the YZ cross-sectional shape of the connection protrusions 26b is a rectangle (oblong), but the shape of the connection protrusions 26b is not limited to this.

The connection recess 27a is recessed toward the inner side of the wall 21 (toward the positive side in the Y-axis direction). The connection recess 27a extends from the lower end to the vicinity of the center of the third surface 20c along the Z-axis. The width of the connection recess 27a in the X-axis increases toward the inner side of the wall 21.

The connection recess 27b is recessed toward the inner side of the wall 21 (toward the positive side in the X-axis direction). The connection recess 27b extends from the lower end to the vicinity of the center of the fourth surface 20d along the Z-axis. The width of the connection recess 27b in the Y-axis increases toward the inner side of the wall 21.

Figure 4:
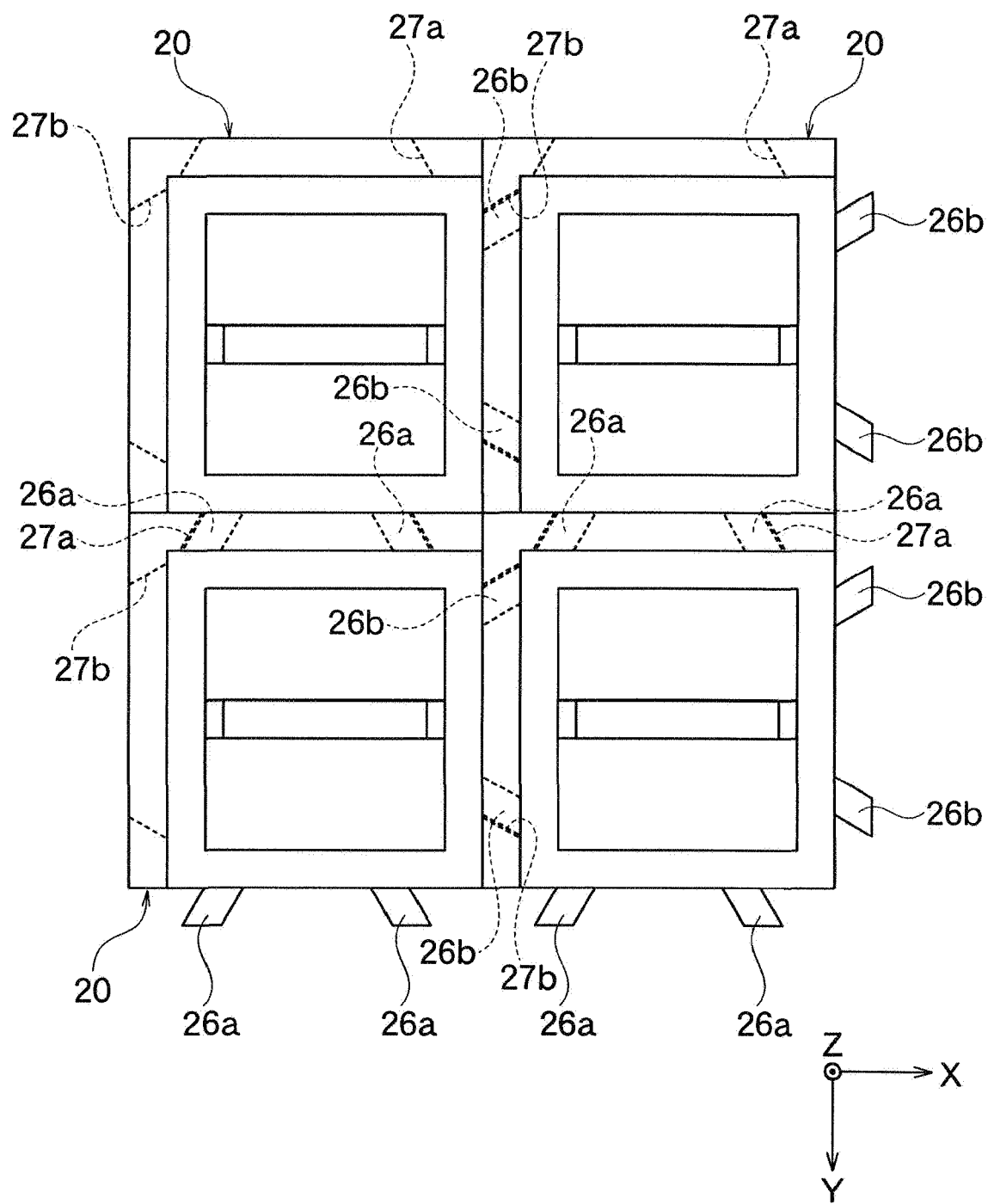
FIG. 4 is a plan view of a plurality of cases being connected.

In the present embodiment, as shown in FIG. 4, the cases 20 adjacent to each other along the Y-axis can be connected by engaging the pair of connection protrusions 26a of the other case 20 with the connection recess 27a of one case 20. For more detail, the cases 20 can be engaged by inserting (sliding) the upper ends of the pair of connection protrusions 26a of the other case 20 from the lower end of the connection recess 27a of one case 20.

Also, the cases 20 adjacent along the X-axis can be connected by engaging the pair of connection protrusions 26b of the other case 20 with the connection recess 27b of one case 20. For more detail, the cases 20 can be engaged by inserting (sliding) the upper ends of the pair of connection protrusions 26b of the other case 20 from the lower end of the connection recess 27b of one case 20.

Figure 6:
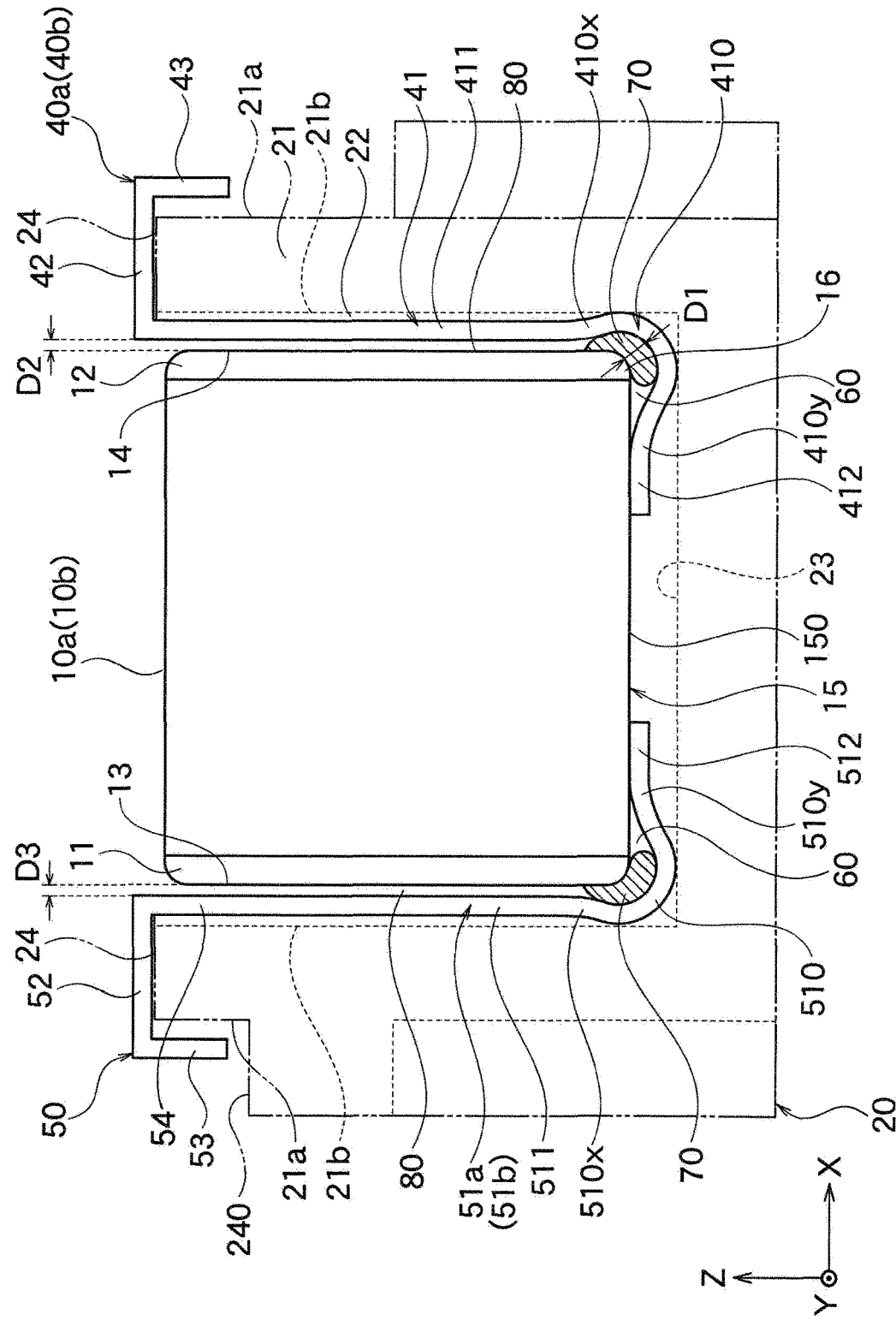
FIG. 6 is a side view of the chip components and the conductive terminals shown in FIG. 1A.

As shown in FIG. 6, the individual conductive terminals 40a and 40b are attached to the case 20. The individual conductive terminal 40a is electrically connected to the terminal electrode 12 of the capacitor chip 10a, and the individual conductive terminal 40b is electrically connected to the terminal electrode 12 of the capacitor chip 10b.

Figure 5:
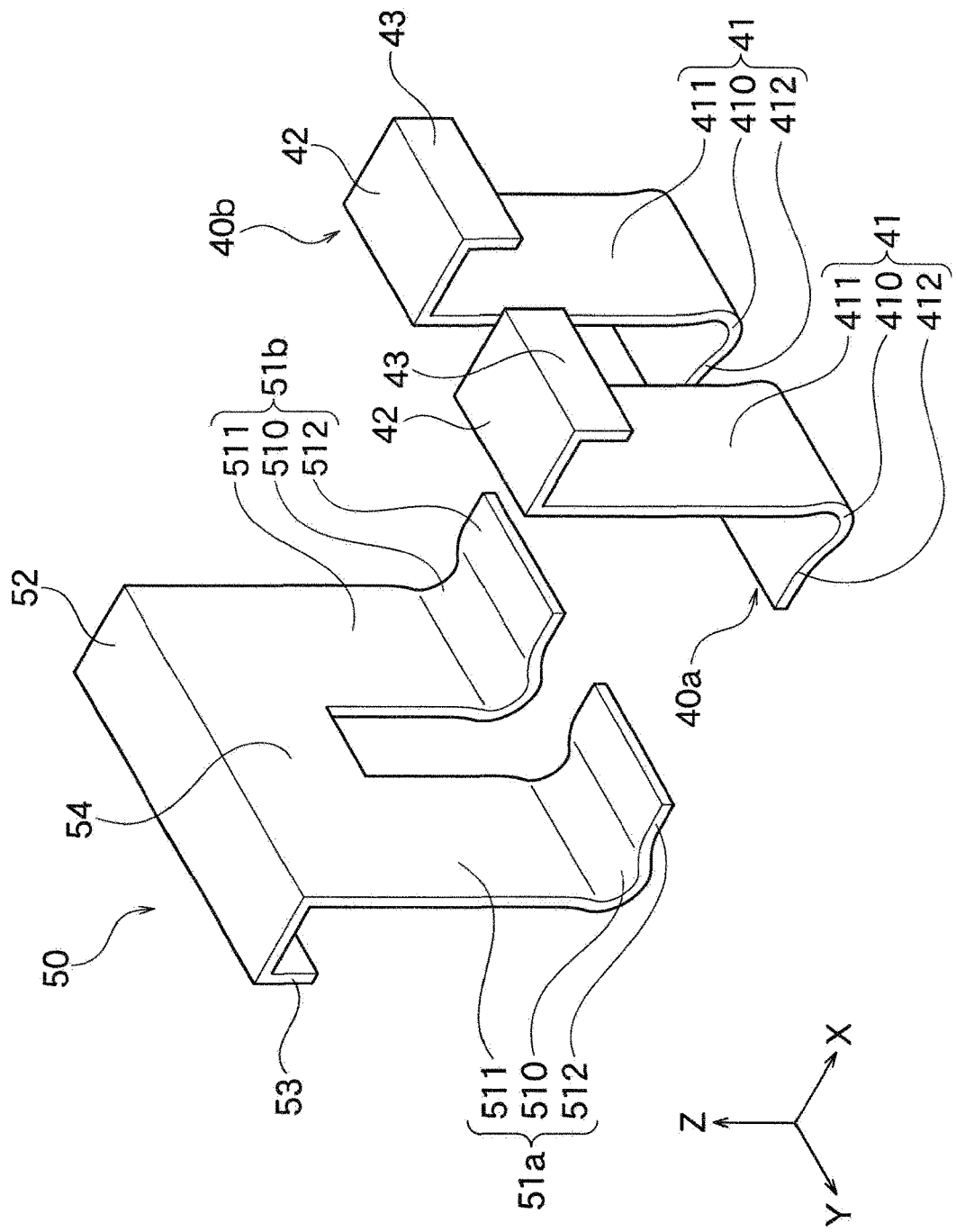
FIG. 5 is a perspective view of conductive terminals shown in FIG. 1A.

As shown in FIG. 5, the individual conductive terminal 40a and the individual conductive terminal 40b have the same shape, but may have different shapes. Hereinafter, in order to avoid duplication of description, only the individual conductive terminal 40a is described with respect to the common structure between the individual conductive terminal 40a and 40b.

The individual conductive terminal 40a is made of a conductive material, such as a metal. Examples of the metal constituting the individual conductive terminals 40a include iron, nickel, copper, silver, and alloys containing these. A metal film may be formed on the surface of the individual conductive terminal 40a by plating using a material of Ni, Sn, Cu, etc.

The width of the individual conductive terminal 40a in the Y-axis is substantially the same as the width of the capacitor chip 10a (FIG. 1A) in the Y-axis, but may be different from the width of the capacitor chip 10a in the Y-axis. The plate thickness of the individual conductive terminal 40a is, for example, 0.01 to 2.0 mm.

The individual conductive terminal 40a includes an inner electrode portion 41. The individual conductive terminal 40a may include an opening-edge electrode portion 42 and a side-surface electrode portion 43. As shown in FIG. 6, the side-surface electrode portion 43 is opposed to the outer surface 21a of the wall 21. The side-surface electrode portion 43 is disposed away from the outer surface 21a in the X-axis, but may be in contact with the outer surface 21a.

The opening-edge electrode portion 42 continues to the side-surface electrode portion 43 and extends in a direction orthogonal to the side-surface electrode portion 43. The opening-edge electrode portion 42 is opposed to the opening edge surface 24 of the wall 21. The opening-edge electrode portion 42 is in contact with the opening edge surface 24, but may be separated from the opening edge surface 24.

As shown in FIG. 5, each of the inner electrode portions 41 includes a space formation portion 410. Each of the inner electrode portions 41 may include an end-surface opposing portion 411 and a side-surface support portion 412. As shown in FIG. 6, each of the inner electrode portions 41 is disposed in the accommodation recess 22 and electrically connected to the terminal electrode 12 of the capacitor chip 10a.

The end-surface opposing portion 411 continues to the opening-edge electrode portion 42 and extends in a direction orthogonal to the opening-edge electrode portion 42. The end-surface opposing portion 411 is disposed away from the inner surface 21b in the X-axis, but may be in contact with the inner surface 21b. The end-surface opposing portion 411 is disposed in parallel to the inner surface 21b of the wall 21, but may be inclined to the inner surface 21b.

The end-surface opposing portion 411 is disposed away from the end surface 14 of the capacitor chip 10a by a distance D2. Thus, a gap 80 is formed between the end-surface opposing portion 411 and the end surface 14, but the end-surface opposing portion 411 may be in contact with the end surface 14 (terminal electrode 12). The gap 80 may be filled with the resin 30 (FIG. 2). The end-surface opposing portion 411 is disposed in parallel to the end surface 14, but may be inclined to the end surface 14.

The side-surface support portion 412 is in contact with at least one of the side surfaces 15 of the capacitor chip 10a and supports the capacitor chip 10a. Hereinafter, among the four surfaces constituting the side surfaces 15, the surface in contact with the side-surface support portion 412 is referred to as a "terminal fixation surface". The terminal fixation surface 150 is a surface opposing to the bottom surface 23 of the case 20.

The side-surface support portion 412 is disposed in parallel to the terminal fixation surface 150 and is in contact with the terminal fixation surface 150 as a whole. The shape of the side-surface support portion 412 is not limited to the shape shown in FIG. 6, and the side-surface support portion 412 may partly be inclined to the terminal fixation surface 150. The side-surface support portion 412 may locally be in contact with the terminal fixation surface 150.

The space formation portion 410 is located between the end-surface opposing portion 411 and the side-surface support portion 412 and is continuous to them. The space formation portion 410 is disposed closer to the bottom surface 23 than to the opening of the accommodation recess 22. The space formation portion 410 is bent (curved) in a substantially C-shape or a substantially semicircular shape and expands (protrudes) toward a direction away from the outer surface (the end surface 14 and the terminal fixation surface 150) of the capacitor chip 10a. A part of the space formation portion 410 protrudes toward the positive side in the X-axis direction from the end-surface opposing portion 411. Another part of the space formation portion 410 protrudes toward the negative side in the Z-axis direction from the side-surface support portion 412.

A first end 410x of the space formation portion 410 is located above the terminal fixation surface 150 of the capacitor chip 10a. The first end 410x is the position where the space formation portion 410 begins to incline with respect to the end-surface opposing portion 411. The space formation portion 410 begins to curve toward a direction away from the end surface 14 of the capacitor chip 10a (toward the positive side in the X-axis direction) above the terminal fixation surface 150.

A second end 410y of the space formation portion 410 is located below the terminal fixation surface 150 of the capacitor chip 10a. The second end 410y is the position where the space formation portion 410 begins to incline with respect to the side-surface support portion 412. Also, the second end 410y is the position where the space formation portion 410 is in contact with the terminal fixation surface 150. The space formation portion 410 begins to curve toward a direction away from the terminal fixation surface 150 (toward the negative side in the Z-axis direction) below the terminal fixation surface 150.

The space formation portion 410 may be disposed around a corner 18 of the capacitor chip 10a intersected by the end surface 14 and the terminal fixation surface 150. The space formation portion 410 may be bent so as to surround the corner 18. The space formation portion 410 is smoothly curved, but the shape of the space formation portion 410 is not limited to this. For example, the space formation portion 410 may be bent discontinuously. Moreover, the space formation portion 410 may be bent at a plurality of times.

The space formation portion 410 is located at a corner of the accommodation recess 22 intersected by the bottom surface 23 and the inner surface 21b of the wall 21. A part of the space formation portion 410 may be in contact with the inner surface 21b. Another part of the space formation portion 410 may be in contact with the bottom surface 23.

The space formation portion 410 forms a filling space 60 with the outer surface of the capacitor chip 10a. The filling space 60 is a space sandwiched between the outer surface of the capacitor chip 10a and the space formation portion 410. The filling space 60 is filled with a conductive agent 70 made of solder, conductive adhesive, or the like. The filling space 60 may be formed along the periphery of the corner 18 of capacitor chip 10a.

The filling space 60 is formed continuously with the gap 80. The distance (maximum distance) D1 between the corner 18 of the capacitor chip 10a and the space formation portion 410 may be larger than the distance D2 between the end surface 14 and the end-surface opposing portion 411 along the X-axis. Moreover, a distance between the end surface 14 of the capacitor chip 10a and the space formation portion 410 along the X-axis may be larger than the distance D2 between the end surface 14 and the end-surface opposing portion 411 along the X-axis. Also, a distance between the terminal fixation surface 150 of the capacitor chip 10a and the space formation portion 410 along the Z-axis may be larger than the distance D2 between the end surface 14 and the end-surface opposing portion 411 along the X-axis.

The space formation portion 410 forms the filling space 60 with the end surface 14 and forms the filling space 60 with the terminal fixation surface 150. Thus, the conductive agent 70 is filled between the end surface 14 and the space formation portion 410 and is filled between the terminal fixation surface 150 and the space formation portion 410. The space formation portion 410 and the terminal electrode 12 are physically and electrically connected via the conductive agent 70 filled in the filling space 60.

In the example shown in FIG. 6, the filling space 60 is not completely filled with the conductive agent 70, but may completely be filled with the conductive agent 70. Also, the conductive agent 70 may be filled in the gap 80.

The common conductive terminal 50 is attached to the case 20. As shown in FIG. 1A, the common conductive terminal 50 is electrically connected to the terminal electrode 11 of the capacitor chip 10a and the terminal electrode 11 of the capacitor chip 10b. The common conductive terminal 50 is made of the same material as the individual conductive terminal 40a.

As shown in FIG. 5, the common conductive terminal 50 includes inner electrode portions 51a and 51b. The common conductive terminal 50 may include an opening-edge electrode portion 52, a side-surface electrode portion 53, and a connection portion 54. As shown in FIG. 6, the side-surface electrode portion 53 is disposed on the stepped portion 240 and opposed to the outer surface 21a of the wall 21. The side-surface electrode portion 53 is disposed away from the outer surface 21a along the X-axis, but may be in contact with the outer surface 21a.

The opening-edge electrode portion 52 continues to the side-surface electrode portion 53 and extends in a direction orthogonal to the side-surface electrode portion 53. The opening-edge electrode portion 52 is opposed to the opening edge surface 24 of the wall 21. The opening-edge electrode portion 52 is in contact with the opening edge surface 24, but may be separated from the opening edge surface 24.

The connection portion 54 continues to the opening-edge electrode portion 52 and extends in a direction orthogonal to the side-surface electrode portion 53. The connection portion 54 is disposed away from the inner surface 21b of the wall 21 along the X-axis, but may be in contact with the inner surface 21b. The connection portion 54 is disposed in parallel to the inner surface 21b, but may be inclined to the inner surface 21b. As shown in FIG. 5, the connection portion 54 serves to connect the inner electrode portion 51a and the inner electrode portion 51b along the Y-axis. The connection portion 54 is disposed in the communication groove 25a (FIG. 3) of the case 20.

The inner electrode portion 51a includes a space formation portion 510. The inner electrode portion 51a may include an end-surface opposing portion 511 and a side-surface support portion 512. The inner electrode portion 51b includes a space formation portion 510. The inner electrode portion 51b may include an end-surface opposing portion 511 and a side-surface support portion 512.

As shown in FIG. 6, the inner electrode portion 51a is disposed in the accommodation recess 22 and electrically connected to the terminal electrode 11 of the capacitor chip 10a. The inner electrode portion 51b is disposed in the accommodation recess 22 and electrically connected to the terminal electrode 11 of the capacitor chip 10b.

The inner electrode portion 51a and the inner electrode portion 51b have the same shape, but may have different shapes. Hereinafter, in order to avoid duplication of description, only the inner electrode portion 51a is described with respect to the common structure between the inner electrode portions 51a and 51b. Except for the matters described below, the structure of the inner electrode portion 51a is the same as the structure of the inner electrode portion 41. Thus, in order to avoid duplication of description, the structure of the inner electrode portion 51a common to that of the inner electrode portion 41 is not described.

The end-surface opposing portion 511 continues to the connection portion 54 and extends in parallel to the connection portion 54. The end-surface opposing portion 511 may be inclined to the connection portion 54. The end-surface opposing portion 511 is disposed away from the end surface 13 of the capacitor chip 10a by a distance D3. Thus, the gap 80 is formed between the end-surface opposing portion 511 and the end surface 13. The distance D3 is the same as the distance D2, but may be different from the distance D2.

The space formation portion 510 expands (protrudes) toward a direction away from the outer surface (the end surface 13 and the terminal fixation surface 150) of the capacitor chip 10a. A part of the space formation portion 510 protrudes toward the negative side in the X-axis direction from the end-surface opposing portion 511. Another part of the space formation portion 510 protrudes toward the negative side in the Z-axis direction from the side-surface support portion 512.

A first end 510x of the space formation portion 510 is located above the terminal fixation surface 150 of the capacitor chip 10a. The first end 510x is the position where the space formation portion 510 begins to incline with respect to the end-surface opposing portion 511. The space formation portion 510 begins to curve toward a direction away from the end surface 13 of the capacitor chip 10a (toward the negative side in the X-axis direction) above the terminal fixation surface 150.

A second end 510y of the space formation portion 510 is located below the terminal fixation surface 150 of the capacitor chip 10a. The second end 510y is the position where the space formation portion 510 begins to incline with respect to the side-surface support portion 512. Also, the second end 510y is the position where the space formation portion 510 is in contact with the terminal fixation surface 150. The space formation portion 510 begins to curve toward a direction away from the terminal fixation surface 150 (toward the negative side in the Z-axis direction) below the terminal fixation surface 150.

The electronic device 1 can be manufactured as follows. First, the case 20 shown in FIG. 3 is prepared, and the individual conductive terminals 40a and 40b and the common conductive terminal 50 are attached to the case 20 as shown in FIG. 6. Next, the capacitor chip 10a is accommodated into the accommodation space 22a, and the capacitor chip 10b is accommodated into the accommodation space 22b. Next, the conductive agent 70 is filled into the filling space 60 formed at the position of the space formation portion 410 of the individual conductive terminal 40a using a device such as a dispenser. Likewise, the conductive agent 70 is filled into the filling space 60 formed at the position of the space formation portion 410 of the individual conductive terminal 40b. Moreover, the conductive agent 70 is filled into the filling space 60 formed at each position of the inner electrode portions 51a and 51b of the common conductive terminal 50. Next, the resin 30 (FIG. 2) is filled into the accommodation recess 22 so as to cover the conductive agent 70. The amount of the resin 30 to be filled is not limited. For example, the resin 30 may be filled into the accommodation recess 22 until the capacitor chips 10a and 10b are covered with the resin 30. The electronic device 1 can be manufactured in the above-mentioned manner.

Before attaching the individual conductive terminals 40a and 40b and the common conductive terminal 50 to the case 20, the individual conductive terminals 40a and 40b and the common conductive terminal 50 are previously attached to the capacitor chips 10a and 10b. Before accommodating the capacitor chips 10a and 10b into the accommodation spaces 22a and 22b, the resin 30 may be filled in the accommodation recess 22.

Specifically, previously, the individual conductive terminal 40a is attached to the terminal electrode 12 of the capacitor chip 10a shown in FIG. 6, and the conductive agent 70 is filled in the filling space 60 formed at the position of the space formation portion 410 of the individual conductive terminal 40a. Also, the individual conductive terminal 40b is attached to the terminal electrode 12 of the capacitor chip 10b, and the conductive agent 70 is filled in the filling space 60 formed at the position of the space formation portion 410 of the individual conductive terminal 40b. Also, the common conductive terminal 50 is attached to the terminal electrodes 11 of the capacitor chips 10a and 10b, and the conductive agent 70 is filled in the filling space 60 formed at each position of the inner electrode portions 51a and 51b.

As a result, it is possible to form an assembly consisting of the capacitor chips 10a and 10b, the individual conductive terminals 40a and 40b, and the common conductive terminal 50. Next, the resin 30 is filled into the accommodation recess 22. Next, the above-mentioned assembly is accommodated into the accommodation recess 22. At this time, the individual conductive terminals 40a and 40b and the common conductive terminal 50 are attached to the case 20.

Accordingly, the filling space 60 can be filled with the conductive agent 70 outside the accommodation recess 22 by forming the assembly before attaching the individual conductive terminals 40a and 40b and the common conductive terminal 50 to the case 20. Thus, the conductive agent 70 is more easily filled into the filling space 60 compared to when the conductive agent 70 is filled into the filling space 60 inside the accommodation recess 22.

In the electronic device 1 of the present embodiment, the terminal electrode 12 and the space formation portion 410 can be connected via the conductive agent 70 by filling the filling space 60 with the conductive agent 70. As a result, it is possible to prevent the occurrence of contact failure (open failure) between the inner electrode portion 41 and the terminal electrode 12 due to expansion of the resin 30 (FIG. 2) filled in the accommodation recess 22.

The filling space 60 is formed at a position closer to the bottom surface 23 than to the opening of the accommodation recess 22. Thus, the conductive agent 70 filled in the filling space 60 is covered with the resin 30 (FIG. 2) filled in the accommodation recess 22. As a result, it is possible to prevent the exposure of the conductive agent 70 to the external space and to improve the humidity resistance of the conductive agent 70 and, furthermore, the reliability of the electronic device 1.

The space formation portion 410 and the terminal electrode 12 are connected via the conductive agent 70 filled in the filling space 60. Since the space formation portion 410 and the terminal electrode 12 are physically connected in such a manner, it is possible to prevent a contact failure between the inner electrode portion 41 and the terminal electrode 12 due to expansion of the resin 30 (FIG. 2).

The space formation portion 410 protrudes toward a direction away from the outer surface (the end surface 14 and the terminal fixation surface 150) of the capacitor chip 10a. Thus, the distance between the outer surface of the capacitor chip 10a and the space formation portion 410 is increased, and the volume of the filling space 60 can be increased. As a result, the volume of the conductive agent 70 filled in the filling space 60 is increased, and the connection strength between the space formation portion 410 and the terminal electrode 12 can be increased.

The terminal fixation surface 150 of the capacitor chip 10a is opposed to the bottom surface 23, and the space formation portion 410 is located around the corner 18 of the capacitor chip 10a. In this case, the space formation portion 410 is disposed at a position closer to the bottom surface 23 than to the opening of the accommodation recess 22, and the filling space 60 is also formed at a position closer to the bottom surface 23 than to the opening of the accommodation recess 22. Thus, the conductive agent 70 filled in the filling space 60 can be covered with the resin 30 (FIG. 2) so as not to be exposed to the external space.

The space formation portion 410 is bent and surrounds the corner 18 so as to form the filling space 60 between the end surface 14 and the space formation portion 410 and between the terminal fixation surface 150 and the space formation portion 410. In this case, the filling space 60 is surrounded by the space formation portion 410 and the end surface 14 and is also surrounded by the space formation portion 410 and the terminal fixation surface 150. Thus, the conductive agent 70 is less likely to leak from the filling space 60, and the volume of the conductive agent 70 filled in the filling space 60 can be increased.

The distance (maximum distance) D1 between the space formation portion 410 and the corner 18 of the capacitor chip 10a is larger than the distance D2 between the end-surface opposing portion 411 and the end surface 14. Thus, it is possible to increase the volume of the filling space 60 and the volume of the conductive agent 70 filled in the filling space 60.

A two-series capacitor circuit consisting of the capacitor chips 10a and 10b can be formed by connecting the individual conductive terminals 40a and 40b shown in FIG. 1A to an external circuit and leaving the common conductive terminal 50 floating.

A two-parallel capacitor circuit consisting of the capacitor chips 10a and 10b can be formed by connecting both of the individual conductive terminals 40a and 40b and the common conductive terminal 50 to an external circuit.

A multiple-series or multiple-parallel capacitor circuit can be formed by, as shown in FIG. 4, connecting a plurality of cases 20 and further connecting the capacitor chips 10a and 10*b* accommodated in each of the cases 20 to each other with conductive terminals between the cases 20.

The direction in which the electronic device 1 is mounted on an external circuit is not limited. For example, the opening-edge electrode portions 42 of the individual conductive terminals 40*a* and 40*b* and/or the opening-edge electrode portion 52 of the common conductive terminal 50 may be connected to an external circuit in a state where the opening surface of the case 20 shown in FIG. 1A is directed to the external circuit (substrate). Instead, the side-surface electrode portions 43 of the individual conductive terminals 40*a* and 40*b* may be connected to an external circuit in a state where the wall 21 of the case 20 (e.g., the second surface 20*b* of the case 20) is directed to an external circuit (substrate).

Second Embodiment

Figure 7:
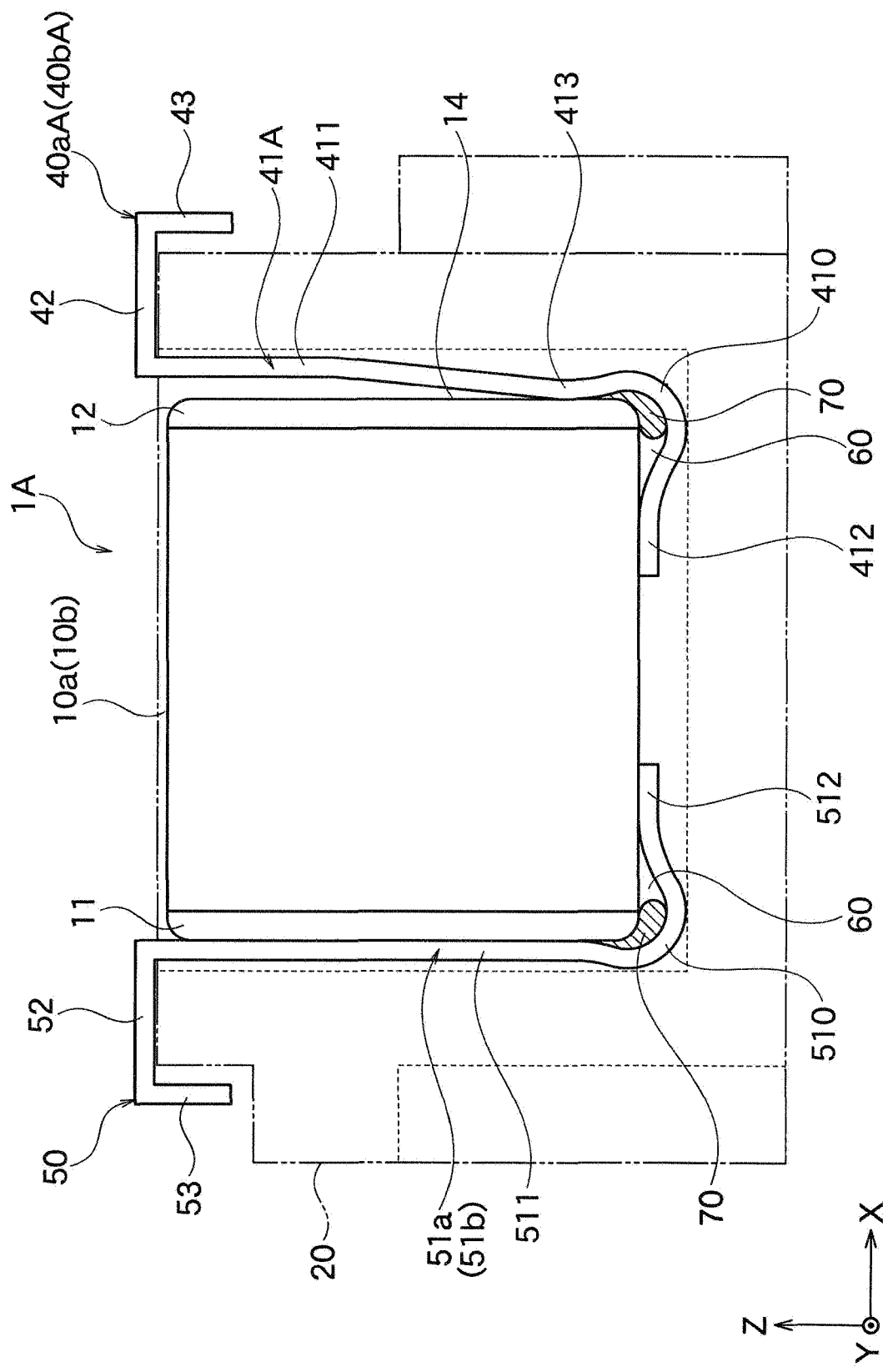
FIG. 7 is a side view of an electronic device according to Second Embodiment.

Except for the matters described below, an electronic device 1A of Second Embodiment shown in FIG. 7 has the same structure as the electronic device 1 of First Embodiment. Common members to First Embodiment are provided with the same reference numerals and are not described.

The electronic device 1A includes individual conductive terminals 40*a*A and 40*b*A. The structure of the individual conductive terminal 40*a*A is the same as the structure of the individual conductive terminal 40*b*A, but may be different from the structure of the individual conductive terminal 40*b*A.

The individual conductive terminal 40*a*A includes an inner electrode portion 41A. The inner electrode portion 41A is different from the inner electrode portion 41 (FIG. 6) of First Embodiment in that the inner electrode portion 41A includes a bent portion 413. The bent portion 413 is bent (protrudes) toward the end surface 14 of the capacitor chip 10*a*. The protrusion direction of the bent portion 413 and the protrusion direction of the space formation portion 410 are opposite to each other along the X-axis.

The bent portion 413 is continuous with the end-surface opposing portion 411 and is inclined to the end-surface opposing portion 411 toward the negative side in the X-axis direction. The bent portion 413 forms a convex shape protruding toward the negative side in the X-axis direction together with a part of the space formation portion 410.

The end of the bent portion 413 is in contact with the end surface 14 (terminal electrode 12) of the capacitor chip 10*a* at the position of the first end 410*x* of the space formation portion 410, but may be separated from the end surface 14 of the capacitor chip 10*a*. In the present embodiment, the first end 410*x* of the space formation portion 410 is the position where the space formation portion 410 begins to incline with respect to the bent portion 413 in a direction away from the end surface 14. The space formation portion 410 is integrated with the bent portion 413.

The end-surface opposing portion 511 and the connection portion 54 of the common conductive terminal 50 are in contact with the end surface 13 (terminal electrode 11) of the capacitor chip 10*a*, but may be separated from the end surface 13 of the capacitor chip 10*a*. In the present embodiment, the elasticity of the bent portion 413 presses the capacitor chip 10*a* against the end-surface opposing portion 511 and the connection portion 54.

Also in the present embodiment, the same effect as in First Embodiment is obtained. Moreover, in the present embodiment, since the inner electrode portion 41A includes the bent portion 413, the inner electrode portion 41A can be fixed to the terminal electrode 12 by the elasticity of the bent portion 413.

Third Embodiment

Except for the matters described below, an electronic device 1B of Third Embodiment shown in FIG. 8 has the same structure as the electronic device 1A of Second Embodiment. Common members to Second Embodiment are provided with the same reference numerals and are not described.

Figure 9:
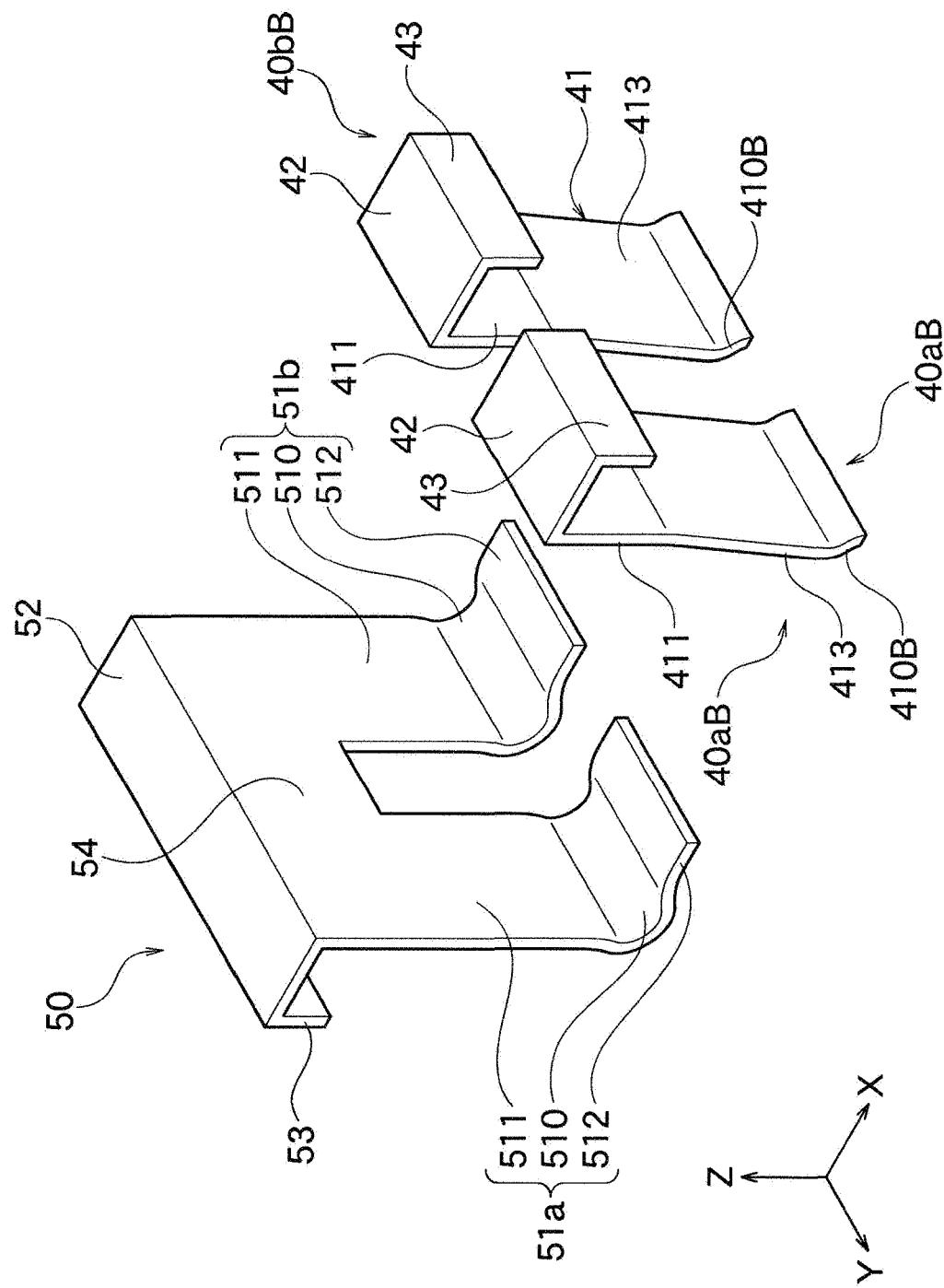
FIG. 9 is a perspective view of conductive terminals shown in FIG. 8.

As shown in FIG. 9, the electronic device 1B includes individual conductive terminals 40*a*B and 40*b*B. The structure of the individual conductive terminal 40*a*B is the same as the structure of the individual conductive terminal 40*b*B, but may be different from the structure of the individual conductive terminal 40*b*B.

The individual conductive terminal 40*a*B includes an inner electrode portion 41B. The inner electrode portion 41B does not include the side-surface support portion 412 (FIG. 7), but includes a space formation portion 410B.

Figure 8:
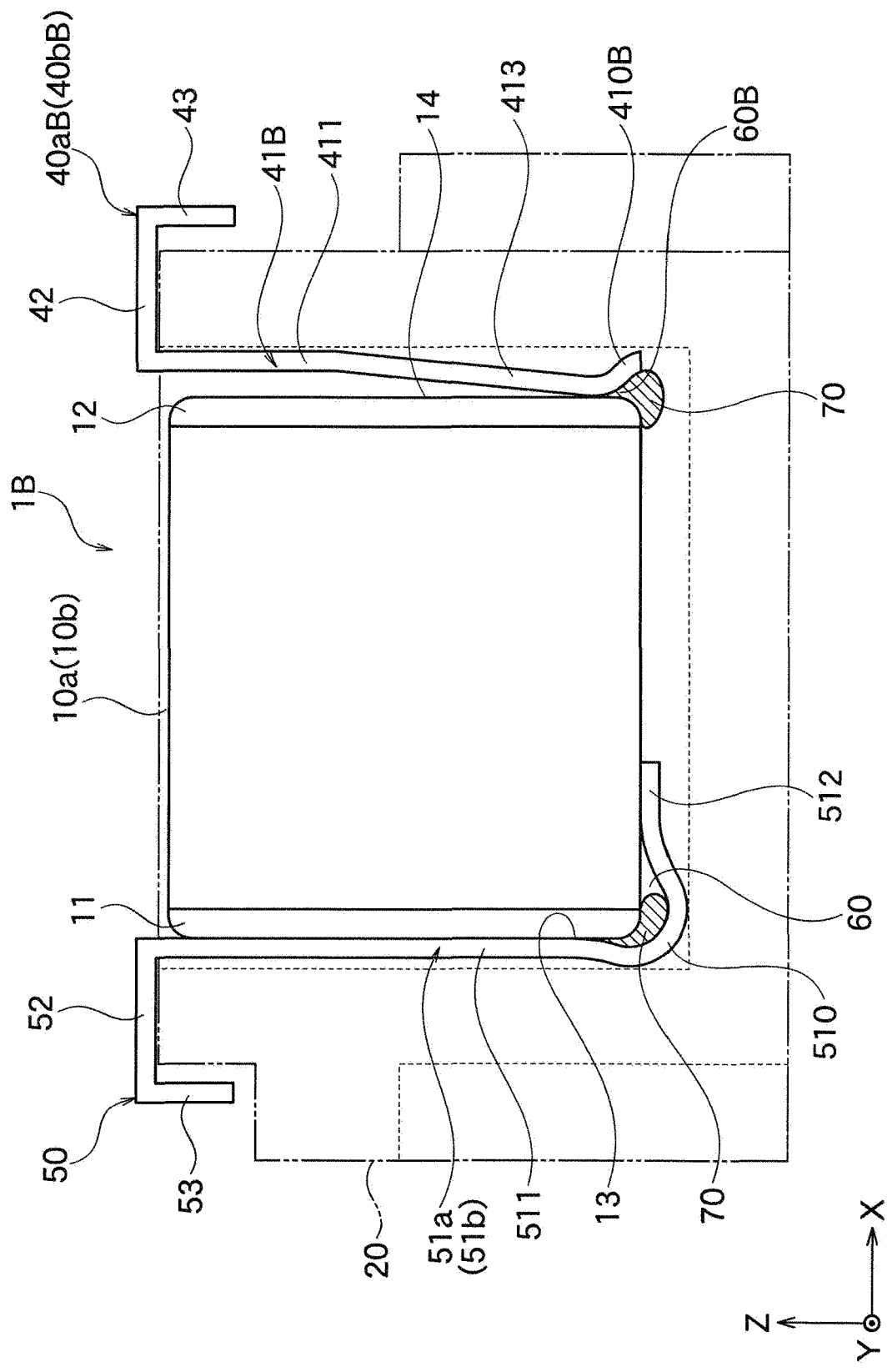
FIG. 8 is a side view of an electronic device according to Third Embodiment.

As shown in FIG. 8, the space formation portion 410B protrudes toward a direction away from the end surface 14 of the capacitor chip 10*a* (toward the positive side in the X-axis direction), but does not protrude toward a direction away from the terminal fixation surface 150 (toward the negative side in the X-axis direction). Thus, a filling space 60B is formed on the positive side of the end surface 14 in the X-axis direction, but is not formed on the negative side of the terminal fixation surface 150 in the Z-axis direction. The filling space 60B has a substantially triangular shape and is open downward. However, the shape of the filling space 60B is not limited to this.

Also in the present embodiment, the same effect as in Second Embodiment is obtained. Moreover, in the present embodiment, since the side-surface support portion 412 (FIG. 7) is omitted from the space formation portion 410B, the structure of the space formation portion 410B can be simplified. In addition, since the filling space 60B is open downward, the conductive agent 70 can easily be filled into the filling space 60B via this opening.

Fourth Embodiment

Figure 10:
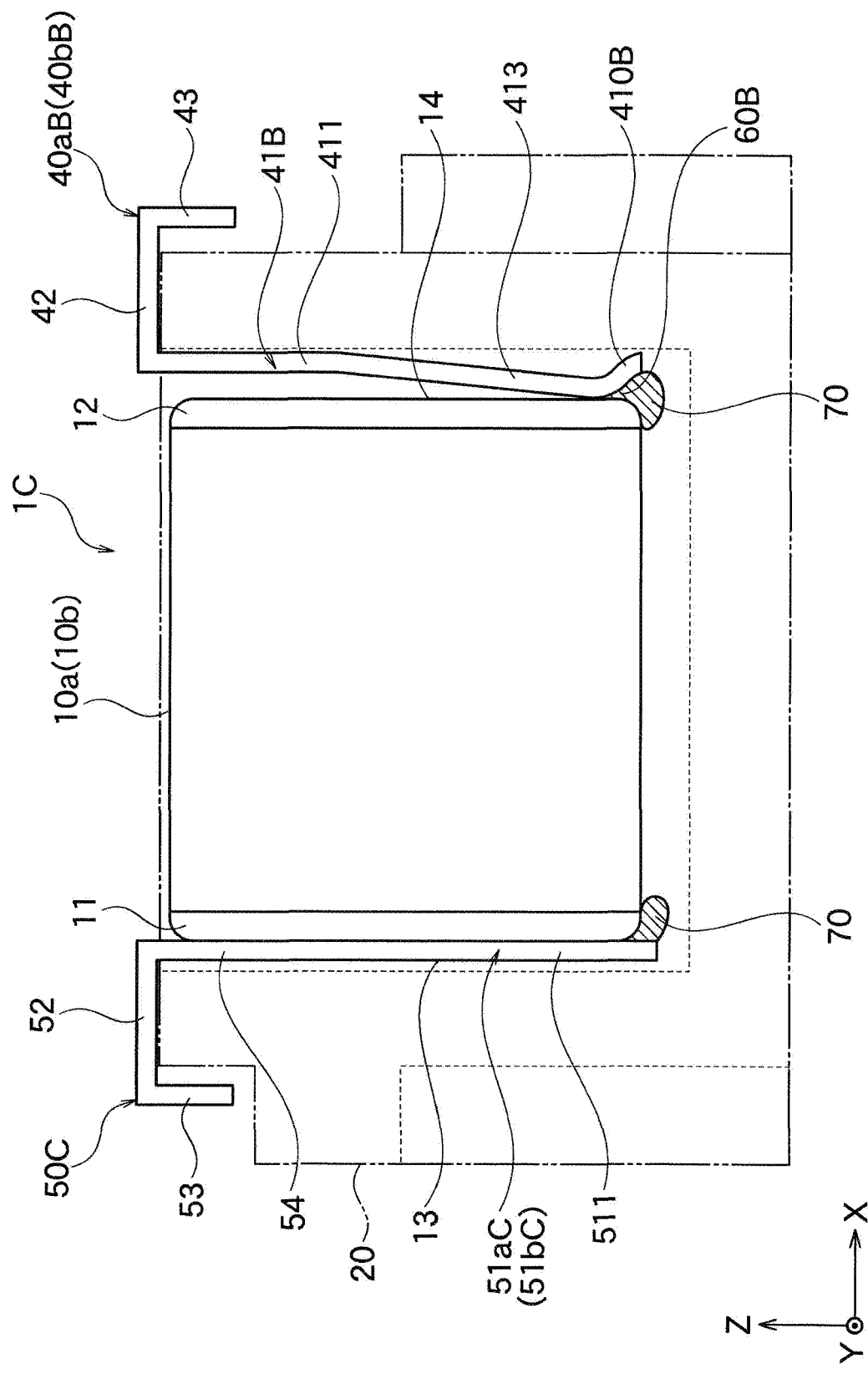
FIG. 10 is a side view of an electronic device according to Fourth Embodiment.

Except for the matters described below, an electronic device 1C of Fourth Embodiment shown in FIG. 10 has the same structure as the electronic device 1B of Third Embodiment. Common members to Third Embodiment are provided with the same reference numerals and are not described.

The electronic device 1C includes a common conductive terminal 50C. The common conductive terminal 50C includes inner electrode portions 51*a*C and 51*b*C. The structure of the inner electrode portion 51*a*C is the same as the structure of the inner electrode portion 51*b*C, but may be different from the structure of the inner electrode portion 51*b*C.

The inner electrode portion 51*a*C is different from the inner electrode portion 51*a* of Third Embodiment in that the inner electrode portion 51*a*C does not include the space formation portion 510 or the side-surface support portion (FIG. 8). The end-surface opposing portion 511 is disposed in parallel to the end surface 13 of the capacitor chip 10*a* and extends along the Z-axis. The lower end of the end-surface opposing portion 511 may be located below the terminal fixation surface 150 of the capacitor chip 10*a*.

The lower end of the end-surface opposing portion 511 is connected to the terminal electrode 11 via the conductive agent 70. The conductive agent 70 is adhered to the inner surface of the end-surface opposing portion 511 constituting a connection surface with the terminal electrode 11, but may be adhered to a surface other than the inner surface.

Also in the present embodiment, the same effect as in Third Embodiment is obtained. Moreover, in the present embodiment, since the end-surface opposing portion 511 is in surface-contact with the terminal electrode 11, electrical connection between them can be ensured. Moreover, since the space formation portion 510 and the side-surface support portion 512 are omitted from the inner electrode portions 51aC and 51bC, the structures of the inner electrode portions 51aC and 51bC can be simplified.

Fifth Embodiment

Except for the matters described below, an electronic device 1D of Fifth Embodiment shown in FIG. 11 has the same structure as the electronic device 1 of First Embodiment. Common members to First Embodiment are provided with the same reference numerals and are not described.

The electronic device 1D includes individual conductive terminals 40aD and 40bD and a common conductive terminal 50D. The structure of the individual conductive terminal 40aD is the same as the structure of the individual conductive terminal 40bD, but may be different from the structure of the individual conductive terminal 40bD.

Figure 12:
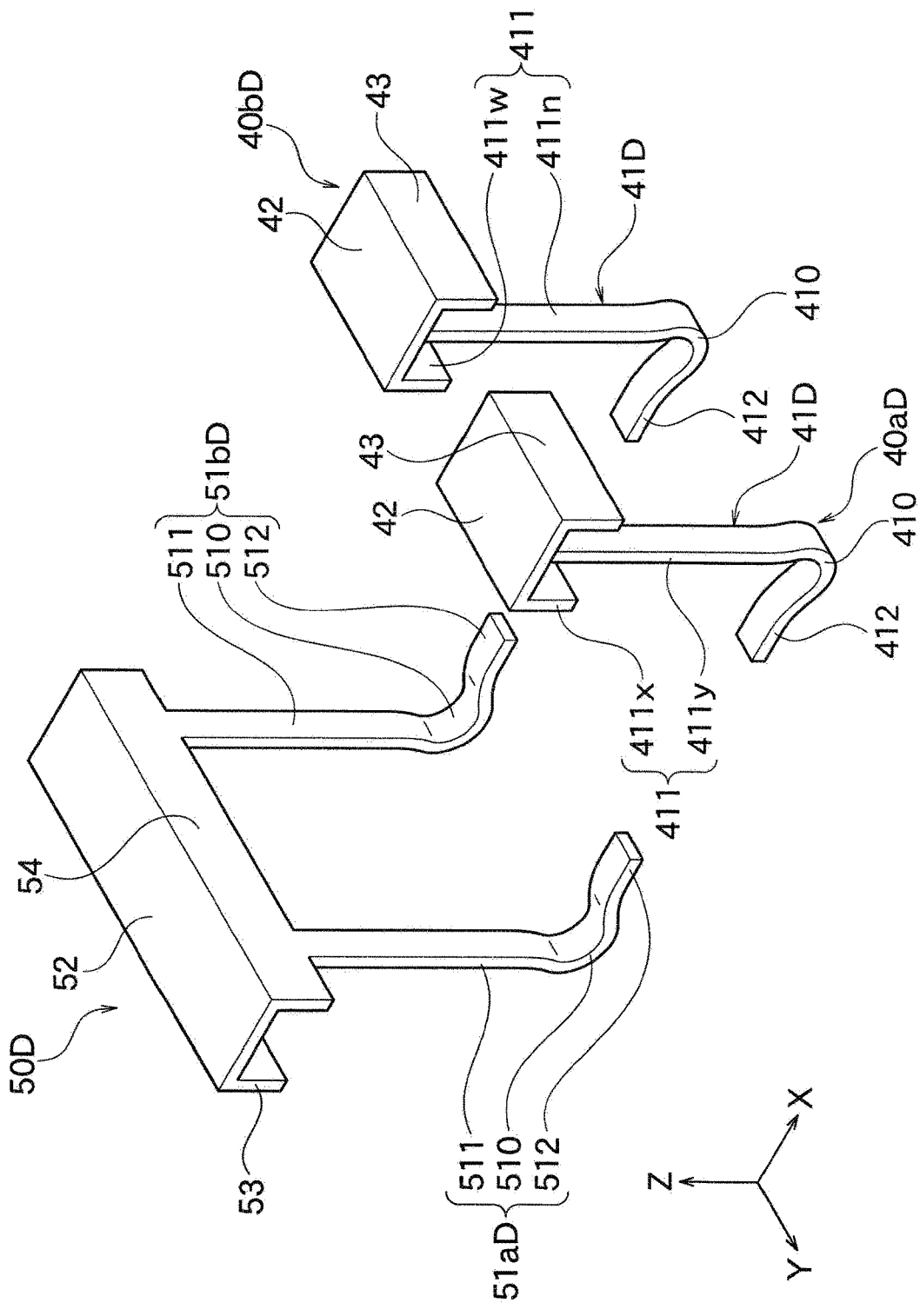
FIG. 12 is a perspective view of conductive terminals shown in FIG. 11.

As shown in FIG. 12, the individual conductive terminal 40aD includes an inner electrode portion 41D. As is clear from the comparison between FIG. 12 and FIG. the inner electrode portion 41D is different from the inner electrode portion 41 of First Embodiment in that the inner electrode portion 41D has a narrow width along the Y-axis.

Figure 11:
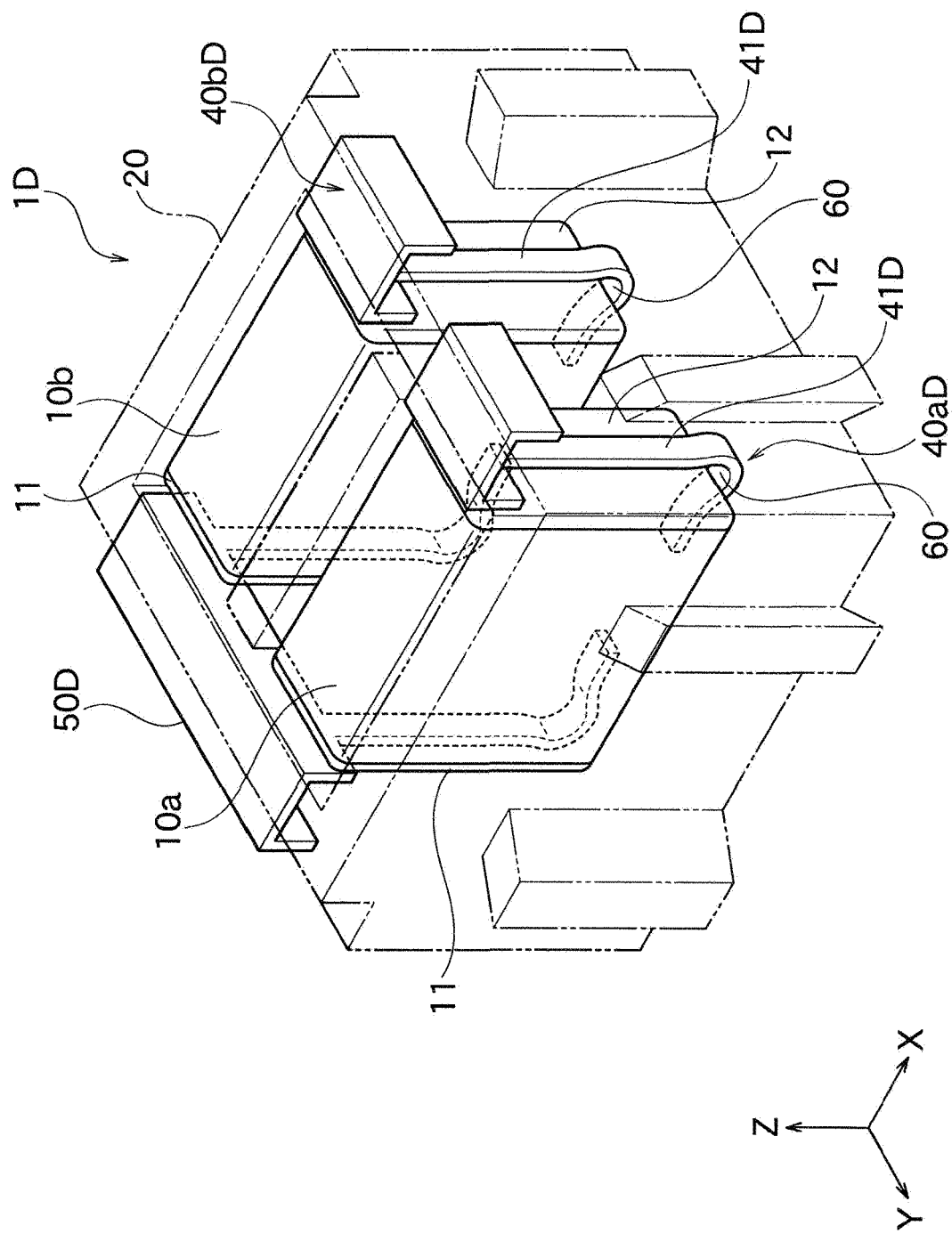
FIG. 11 is a perspective view of an electronic device according to Fifth Embodiment.

As shown in FIG. 11 and FIG. 12, the width of the space formation portion 410 along the Y-axis is smaller than the width of the terminal electrode 12 along the Y-axis. Also, the width of the space formation portion 410 along the Y-axis is smaller than the width of the opening-edge electrode portion 42 or the side-surface electrode portion 43 along the Y-axis. The width of the space formation portion 410 along the Y-axis is, for example, ½ or less of the width of the terminal electrode 12 along the Y-axis.

Likewise, the width of the side-surface support portion 412 along the Y-axis is smaller than the width of the terminal electrode 12 along the Y-axis. Also, the width of the side-surface support portion 412 along the Y-axis is smaller than the width of the opening-edge electrode portion 42 or the side-surface electrode portion 43 along the Y-axis.

The end-surface opposing portion 411 includes a wide portion 411w and a narrow portion 411n. The wide portion 411w is formed wider than the narrow portion 411n along the Y-axis. The width of the wide portion 411w along the Y-axis is the same as the width of the opening-edge electrode portion 42 or the side-surface electrode portion 43 along the Y-axis, but may be different from the width of the opening-edge electrode portion 42 or the side-surface electrode portion 43 along the Y-axis. The narrow portion 411n, the space formation portion 410, and the side support portion 412 have the same width along the Y-axis, but may have different widths along the Y-axis.

The common conductive terminal 50D includes inner electrode portions 51aD and 51bD. As is clear from the comparison between FIG. 12 and FIG. 5, the inner electrode portions 51aD and 51bD are different from the inner electrode portions 51a and 51b of First Embodiment in that the space formation portion 510, the end-surface opposing portion 511, and the side-surface support portion 512 have a narrow width along the Y-axis. The width of the inner electrode portions 51aD and 51bD along the Y-axis is smaller than the width of the terminal electrode 11 along the Y-axis.

The structure of the inner electrode portion 51aD is the same as the structure of the inner electrode portion 51bD, but may be different from the structure of the inner electrode portion 51bD. The width of the inner electrode portion 51aD along the Y-axis is the same as the width of the inner electrode portion 51bD along the Y-axis, but may be different from the width of the inner electrode portion 51bD along the Y-axis.

Also in the present embodiment, the same effect as in First Embodiment is obtained. Moreover, in the present embodiment, the volume of the filling space 60 (FIG. 11) can be adjusted according to the width of the space formation portion 410 along the Y-axis. Thus, the space formation portion 410 and the terminal electrode 12 can be connected via the conductive agent while adjusting the amount of the conductive agent filled in the filling space 60.

Sixth Embodiment

Figure 13:
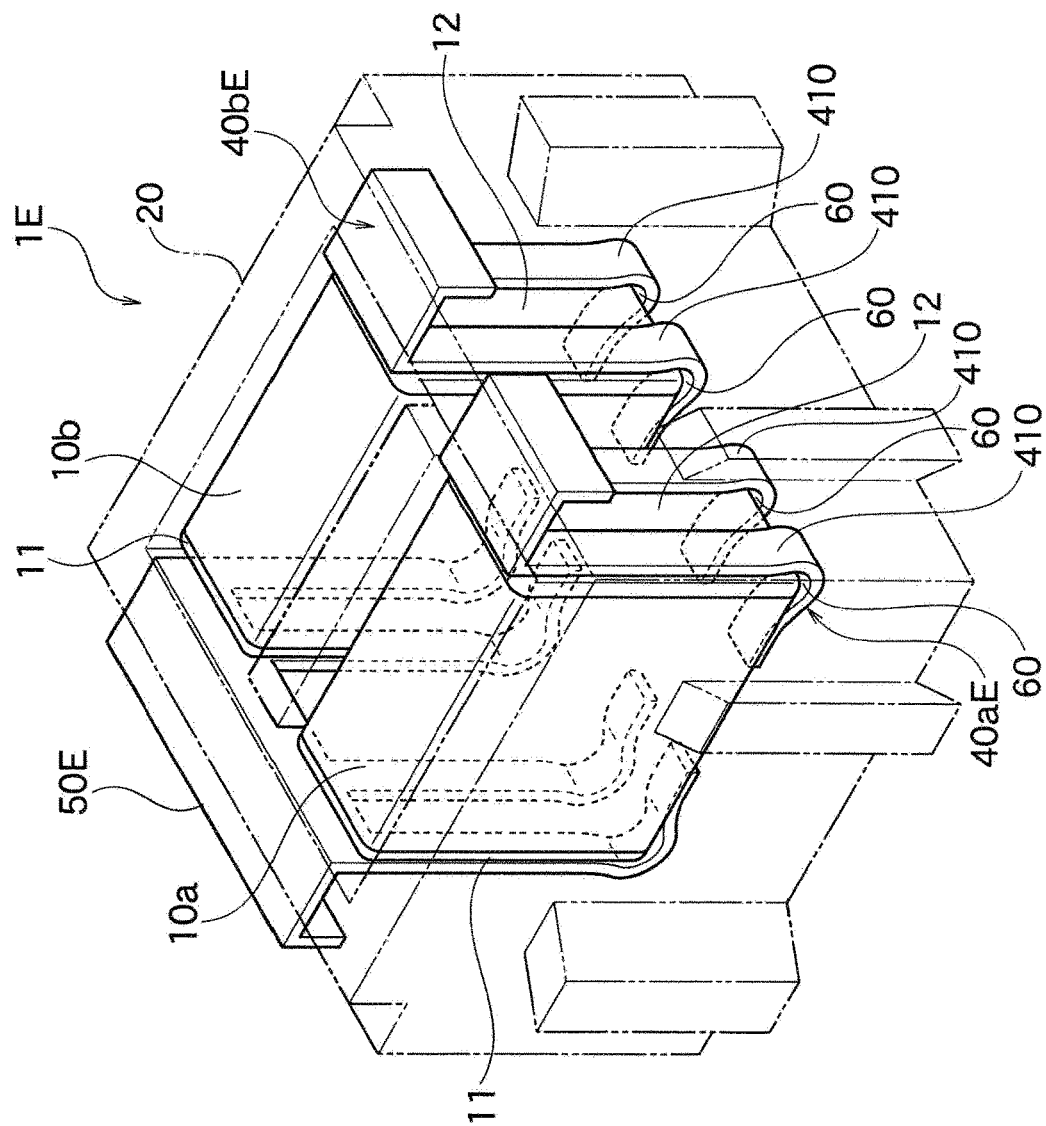
FIG. 13 is a perspective view of an electronic device according to Sixth Embodiment.

Except for the matters described below, an electronic device 1E of Sixth Embodiment shown in FIG. 13 has the same structure as the electronic device 1D of Fifth Embodiment. Common members to Fifth Embodiment are provided with the same reference numerals and are not described.

The electronic device 1E includes individual conductive terminals 40aE and 40bE and a common conductive terminal 50E. The structure of the individual conductive terminal 40aE is the same as the structure of the individual conductive terminal 40bE, but may be different from the structure of the individual conductive terminal 40bE.

The individual conductive terminal 40aE includes inner electrode portions 41D_1 and 41D_2. The structure of the inner electrode portion 41D_1 is the same as the structure of the inner electrode portion 41D_2, but may be different from the structure of the inner electrode portion 41D_2. The inner electrode portion 41D_1 includes the space formation portion 410, the end-surface opposing portion 411, and the side-surface support portion 412. The inner electrode portion 41D_2 includes the space formation portion 410, the end-surface opposing portion 411, and the side-surface support portion 412.

The space formation portion 410 of the inner electrode portion 41D_1 and the space formation portion 410 of the inner electrode portion 41D_2 are separated along the Y-axis. The end-surface opposing portion 411 of the inner electrode portion 41D_1 and the end-surface opposing portion 411 of the inner electrode portion 41D_2 are separated along the Y-axis. The side-surface support portion 412 of the inner electrode portion 41D_1 and the side-surface support portion 412 of the inner electrode portion 41D_2 are separated along the Y-axis.

The common conductive terminal 50E includes inner electrode portions 51aD_1 and 51aD_2 and inner electrode portions 51bD_1 and 51bD_2. The structure of the inner electrode portions 51aD_1 and 51aD_2 is the same as the structure of the inner electrode portions 51bD_1 and 51bD_2, but may be different from the structure of the inner electrode portions 51bD_1 and 51bD_2. Also, the structure of the inner electrode portion 51aD_1 is the same as the structure of the inner electrode portion 51aD_2, but may be different from the structure of the inner electrode portion 51aD_2.

The inner electrode portion 51aD_1 includes the space formation portion 510, the end-surface opposing portion 511, and the side-surface support portion 512. The inner electrode portion 51aD_2 includes the space formation portion 510, the end-surface opposing portion 511, and the side-surface support portion 512.

The space formation portion 510 of the inner electrode portion 51aD_1 and the space formation portion 510 of the inner electrode portion 51aD_2 are separated along the Y-axis. The end-surface opposing portion 511 of the inner electrode portion 51aD_1 and the end-surface opposing portion 511 of the inner electrode portion 51aD_2 are separated along the Y-axis. The side-surface support portion 512 of the inner electrode portion 51aD_1 and the side-surface support portion 512 of the inner electrode portion 51aD_2 are separated along the Y-axis.

Also in the present embodiment, the same effect as in Fifth Embodiment is obtained. Moreover, in the present embodiment, two filling spaces 60 (FIG. 13) are formed at the positions of the space formation portions 410 of each of the inner electrode portions 41D_1 or 41D_2, and the conductive agent 70 can be filled in these filling spaces 60. As a result, at these two positions, two space formation portions 410 can be connected to the terminal electrode 12 of the capacitor chip 10a via the conductive agent 70. This makes it possible to improve the connection reliability between the individual conductive terminal 40aE and the terminal electrode 12.

The present disclosure is not limited to the above-described embodiments and may variously be modified within the scope of the present disclosure.

In each of the above-described embodiments, the chip component is not limited to a capacitor chip and may be a chip inductor, a chip resistor, or the like.

In First Embodiment mentioned above, the electronic device 1 may be provided with only individual conductive terminals as conductive terminals or may be provided with only common conductive terminals. For example, the case 20 shown in FIG. 1A may be provided with four individual conductive terminals or may be provided with two common conductive terminals. The same applies to Second to Sixth Embodiments mentioned above.

In First Embodiment mentioned above, the side-surface support portions 412 shown in FIG. 6 may be omitted. In this case, the terminal fixation surface 150 of the capacitor chip 10a may be supported by the second end 410y of the space formation portion 410. Instead, the second end 410y of the space formation portion 410 may be separated from the terminal fixation surface 150 of the capacitor chip 10a.

In Second Embodiment mentioned above, as shown in FIG. 7, the individual conductive terminals 40a and 40b are provided with the bent portions 413, but the common conductive terminal 50 may also be provided with a bent portion. The same applies to Fourth to Sixth Embodiments mentioned above.

Each of the individual conductive terminals 40aD and 40bD of Fifth Embodiment and the individual conductive terminals 40aE and 40bE of Sixth Embodiment may be provided with the bent portion 413.

Figure 14:
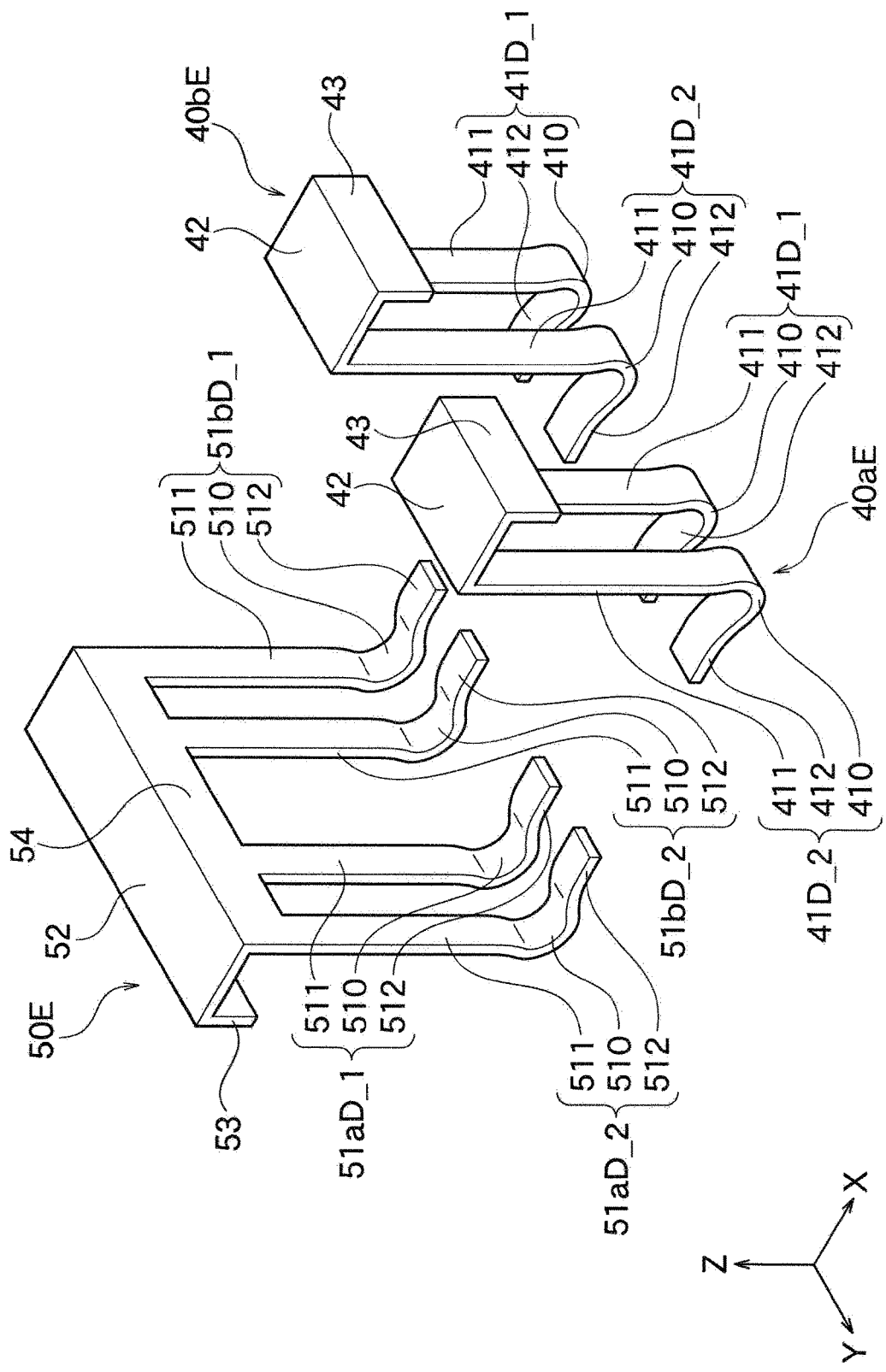
FIG. 14 is a perspective view of conductive terminals shown in FIG. 13.

In Sixth Embodiment mentioned above, the number of inner electrode portions 41D provided in the individual conductive terminal 40aE or 40bE shown in FIG. 14 may be three or more. Moreover, three or more inner electrode portions 51aD may be formed on the common conductive terminal 50E, or three or more inner electrode portions 51bD may be formed.

In First Embodiment mentioned above, the position of the space formation portion 410 in the individual conductive terminal 40a (40b) shown in FIG. 6 may be changed. For example, the space formation portion 410 may be disposed in a central part of the accommodation recess 22 in the Z-axis direction. Instead, the space formation portion 410 may be disposed at any position between the center of the accommodation recess 22 in the Z-axis direction and its bottom (bottom surface 23). The same applies to the space formation portion 510 of the common conductive terminal 50.

Instead, the space formation portion 410 may be disposed in a central part of the capacitor chip 10a (10b) in the Z-axis direction. Instead, the space formation portion 410 may be disposed at any position between the center of the capacitor chip 10a (10b) in the Z-axis direction and its lower end (terminal fixation surface 150). The same applies to the space formation portion 510 of the common conductive terminal 50.

DESCRIPTION OF THE REFERENCE NUMERICAL 1, 1A, 1B, 1C, 1D, 1E . . . electronic device
10a, 10b . . . capacitor chip
11, 12 . . . terminal electrode
13, 14 . . . end surface
15 . . . side surface
150 . . . terminal fixation surface
16 . . . internal electrode layer
17 . . . dielectric layer
18 . . . corner
20 . . . case
21 . . . wall
21a . . . outer surface
21b . . . inner surface
22 . . . accommodation recess
22a, 22b . . . accommodation space
23 . . . bottom surface
24 . . . opening edge surface
240 . . . stepped portion
25 . . . partition portion
25a, 25b . . . communication groove
26a, 26b . . . connection protrusion
27a, 27b . . . connection recess
30 . . . resin
40a, 40b, 40aA, 40bA, 40aB, 40bB, 40aD, 40bD, 40aE, 40bE . . . individual conductive terminal
41, 41A, 41B, 41D, 41D_1, 41D_2 . . . inner electrode portion
410, 410B . . . space formation portion
411 . . . end-surface opposing portion
411w . . . wide portion
411n . . . narrow portion
412 . . . side-surface support portion
413 . . . bent portion
42 . . . opening-edge electrode portion
43 . . . side-surface electrode portion
50, 50C, 50D, 50E . . . common conductive terminal
51a, 51b, 51aC, 51bC, 51aD, 51bD, 51aD_1, 51aD_2, 51bD_1, 51bD_2 . . . inner electrode portion
510 . . . space formation portion
511 . . . end-surface opposing portion
512 . . . side-surface support portion 52 . . . opening-edge electrode portion
53 . . . side-surface electrode portion
54 . . . connection portion
60B . . . filling space
70 . . . conductive agent
80 . . . gap

What is claimed is:

1. An electronic device comprising:
a chip component including a terminal electrode;
a case including an accommodation recess for accommodating the chip component;
a resin filled in the accommodation recess; and
a conductive terminal attachable to the case,
wherein
the conductive terminal includes an inner electrode portion disposed in the accommodation recess and connected to the terminal electrode,
the inner electrode portion includes a space formation portion forming a filling space for a conductive agent with an outer surface of the chip component at a position closer to a bottom surface than to an opening of the accommodation recess,
a side surface of the chip component is opposed to the bottom surface of the accommodation recess,
the space formation portion is located around a corner intersected by an end surface and the side surface of the chip component, and
wherein the space formation portion is bent and surrounds the corner so as to form the filling space between the end surface and the space formation portion and between the side surface and the space formation portion.

2. The electronic device according to claim 1, wherein the space formation portion and the terminal electrode are connected via the conductive agent filled in the filling space.

3. The electronic device according to claim 1, wherein the space formation portion protrudes toward a direction away from the outer surface of the chip component.

4. The electronic device according to claim 1, wherein
the inner electrode portion includes an end-surface opposing portion continuing to the space formation portion and disposed away from the end surface of the chip component, and
a distance between the space formation portion and the end surface of the chip component is larger than a distance between the end-surface opposing portion and the end surface of the chip component.

5. The electronic device according to claim 1, wherein
the inner electrode portion includes a bent portion bent toward the end surface of the chip component, and
the space formation portion is formed integrally with the bent portion.

6. The electronic device according to claim 1, wherein the space formation portion has a width narrower than that of the terminal electrode.

7. The electronic device according to claim 1, wherein
the inner electrode portion includes a plurality of inner electrode portions,
the space formation portion includes a plurality of space formation portions formed in the plurality of inner electrode portions, and
the inner electrode portions are separated from each other.

8. The electronic device according to claim 1, wherein an outer surface of the case is provided with:
a pair of connection protrusions protruding outward from the outer surface of the case; and
a connection recess recessed inward from the outer surface of the case.

* * * * *